US006762896B2

(12) United States Patent
Yoshizawa et al.

(10) Patent No.: US 6,762,896 B2
(45) Date of Patent: Jul. 13, 2004

(54) STORAGE MEDIA READING WRITING SYSTEM

(75) Inventors: Hiroyasu Yoshizawa, Ome (JP); Yoichiro Kobayashi, Ome (JP); Toshio Shinomiya, Ome (JP); Noriyuki Fujii, Ome (JP); Masaki Yoshinaga, Higashiyamato (JP)

(73) Assignee: Hitachi, Ltd., Tokyo (JP)

( * ) Notice: Subject to any disclaimer, the term of this patent is extended or adjusted under 35 U.S.C. 154(b) by 304 days.

(21) Appl. No.: 09/902,581

(22) Filed: Jul. 12, 2001

(65) Prior Publication Data

US 2002/0118479 A1 Aug. 29, 2002

(30) Foreign Application Priority Data

Feb. 28, 2001 (JP) ......................................... 2001-055477

(51) Int. Cl.[7] ................................................ G11B 5/02
(52) U.S. Cl. ..................................... 360/67; 360/244.1
(58) Field of Search ......................... 360/67, 46, 234.4, 360/244.1

(56) References Cited

U.S. PATENT DOCUMENTS

| | | | | | |
|---|---|---|---|---|---|
| 5,583,720 A | * | 12/1996 | Ishida et al. | ............. | 360/97.01 |
| 6,084,746 A | * | 7/2000 | Shiraishi et al. | ......... | 360/244.1 |
| 6,121,800 A | * | 9/2000 | Leighton et al. | ............ | 327/110 |
| 6,134,084 A | * | 10/2000 | Ohwe et al. | ............. | 360/244.1 |
| 6,266,213 B1 | * | 7/2001 | Hiraoka | ................... | 360/244.1 |
| 6,356,113 B1 | * | 3/2002 | Contreras et al. | ............. | 326/82 |
| 6,377,411 B1 | * | 4/2002 | Katsumata et al. | ........... | 360/46 |
| 6,404,579 B1 | * | 6/2002 | Ranmuthu et al. | ............ | 360/66 |
| 6,498,702 B1 | * | 12/2002 | Shimizu et al. | .......... | 360/244.1 |
| 2002/0001149 A1 | * | 1/2002 | Narusawa et al. | ............ | 360/46 |

FOREIGN PATENT DOCUMENTS

| | | | | |
|---|---|---|---|---|
| JP | 3-108120 | | 5/1991 | |
| JP | 03187295 A | * | 8/1991 | ............ H05K/7/20 |

OTHER PUBLICATIONS

Shiraishi, "Chip on Suspension MR Head", 1998 IEMT/IMC Proceedings, pp. 333–336.*

* cited by examiner

Primary Examiner—David Hudspeth
Assistant Examiner—Dan I. Davidson
(74) Attorney, Agent, or Firm—Mattingly, Stanger & Malur, P.C.

(57) ABSTRACT

The storage media recording/writing system includes a media drive circuit, a head retaining means, a head moving means, a head drive circuit, a signal processing circuit, and a controller to control these. The head drive circuit possesses a first semiconductor integrated circuit having an amplifier that amplifies the read signal from the head, and a second semiconductor integrated circuit placed between the first semiconductor integrated circuit and the signal processing circuit, which has a circuit that receives write data from the signal processing circuit and generates a drive signal to drive a write head. Further, the first semiconductor integrated circuit is mounted on a part near the front of the head retaining means, and the second semiconductor integrated circuit is installed on the side of the moving means.

13 Claims, 20 Drawing Sheets

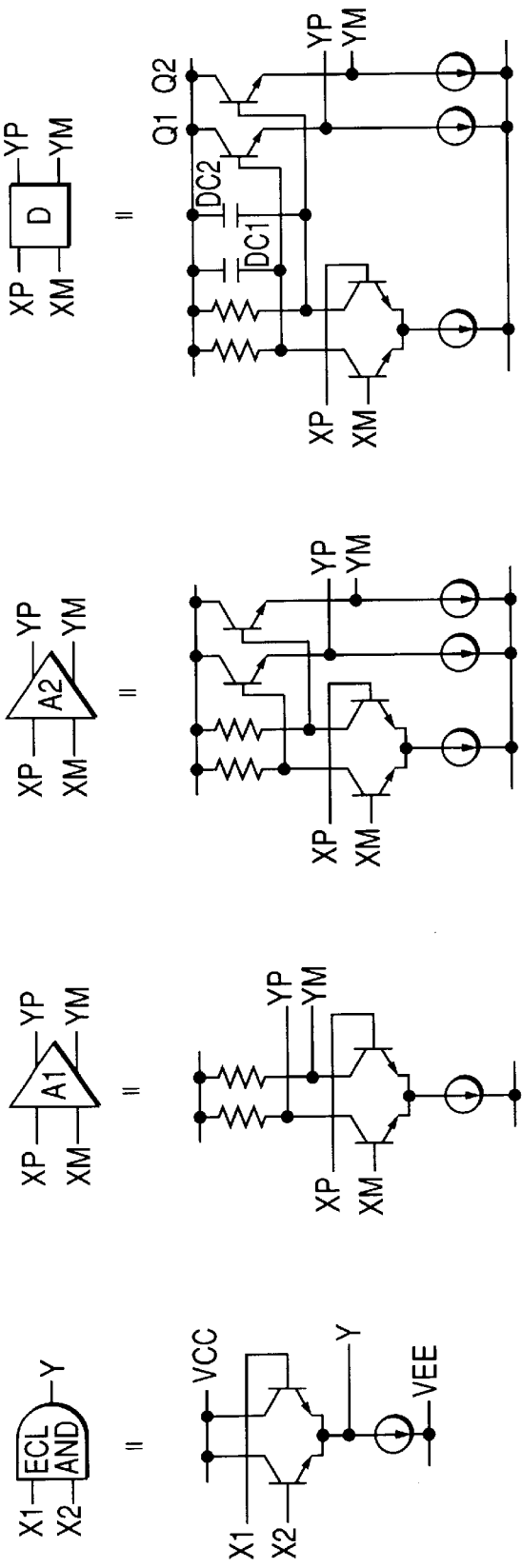

SUPERIMPOSITION ON VEE SIDE

SUPERIMPOSITION ON VCC SIDE

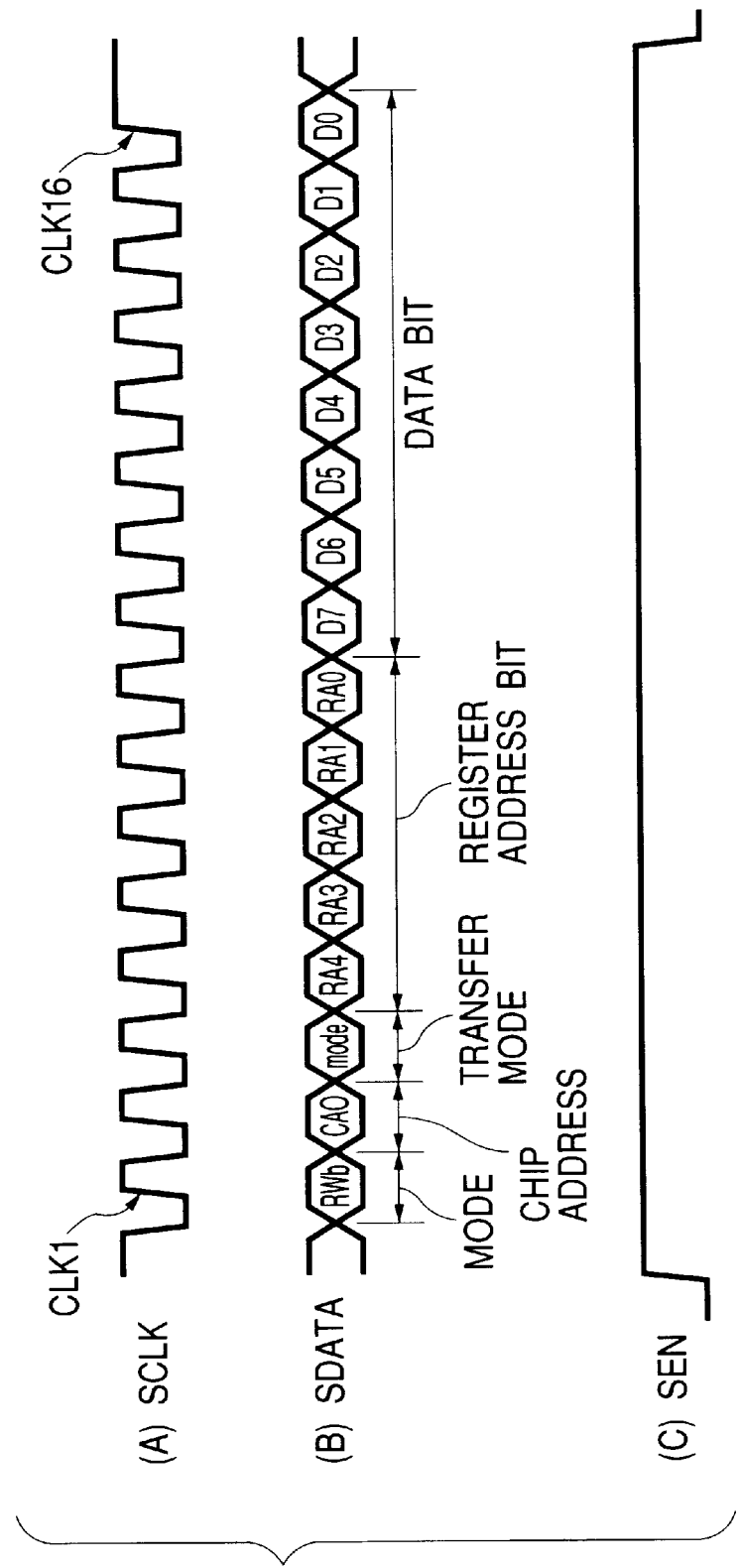

STORAGE MEDIA READING WRITING SYSTEM

BACKGROUND OF THE INVENTION

The present invention relates to a storage media reading/writing system, specifically to a reading/writing semiconductor integrated circuit that amplifies a signal read from a head or drives the head by a write signal in the storage media reading/writing system of the magnetic recording system, which is a technique effective for use in a hard disk drive.

Generally, the hard disk drive is provided on the side of a carriage 130, as shown in FIG. 23, with a reading/writing semiconductor integrated circuit (hereunder, referred to as read write IC) 220 that amplifies a signal read from a magnetic head or drives the magnetic head by a write signal to move an arm 120 furnished with the magnetic head for reading data stored in a magnetic disk 100 as storage media; and, the read write IC 220 and the magnetic head are connected usually with a bendable cable called the FPC (Flexible Printed Circuit). Further, in the hard disk drive containing plural magnetic disks as shown in FIG. 23, the read write IC is designed as an IC for multiple channels that processes, with one IC, the signals from the plural magnetic heads provided correspondingly with the plural magnetic disks each.

SUMMARY OF THE INVENTION

Differently from a semiconductor memory, the magnetic disk drive includes physically movable parts that delay the read and write speed of data, which is disadvantageous, and there is a demand for a still further increase in the speed. In order to enhance the data transfer speed in the magnetic disk drive, it is needed to increase the rotational speed of a disk, namely, a spindle motor, and also to accurately perform the servo control of a voice coil motor that moves the spindle motor and the carriage. Also, the read write IC is required for a high-performance circuit design, so as to amplify high frequency signals.

The applicant of this invention has succeeded in the development of a magnetic disk drive and a high-performance read write IC that permit such a high-speed rotation and an accurate servo control in the high-speed rotation and a high-frequency operation. However, the inventors found a problem that an increase of the data transfer speed will accompany a deterioration of the SN ratio relating to the read signal and the write signal. The inventors examined the cause and source of the problem, accordingly.

As the result, the inventors found that the noises of high-frequency components are created at the magnetic head (especially during writing), and in such a configuration that the read write IC is installed on the carriage and the magnetic head located on the front of the arm is connected to the read write IC with a cable, if the length of the cable is very long, it will function as an antenna to pick up high frequency noises; and the noises picked up by the cable deteriorate the SN ratio since a signal transmitted through the cable is very weak.

Accordingly, the inventors investigated the possibility of shortening the length of the cable that connects the magnetic head and the read write IC by installing the read write IC on the arm. However, the installation of the read write IC on the arm increases the weight of the arm, which interferes with the seek operation, and a large size IC is not permitted to be mounted on the arm. From such circumstances, the inventors reach an idea to divide the functions of the conventional read write IC into plural chips, and to install only the IC on the arm that is connected directly to the magnetic head and has a minimum configuration of a read amplifier and a write amplifier to electrically drive the head, whereby the aforementioned problem can be solved.

Now, in order to solve the problem similar to the above problem, the Japanese Published Unexamined Patent Application No. Hei 3(1991)-108120 discloses an IC that splits the read write IC and installs an IC including a control circuit on the side of the movable arm, and installs an IC chip having a write circuit or a read circuit on the side of the head slider. This prior art presents an example of an IC chip that reduces the load impedance of the write circuit to make a quick rise of the current, and has the write circuit to guarantee a good writing that is installed on the side of the head slider.

Further, this prior art describes that the wiring length between the head IC and the magnetic head has to be made as short as possible, since the noise level mixed in the reading signal is proportional to the wiring length between the head IC and the magnetic head and a longer wiring length produces larger noises. In other words, the prior art considers it desirable to provide an IC chip having a read circuit and a write circuit on the side of the head slider, in view of the characteristics of the read circuit and the write circuit; however, since such an arrangement increases the weight of the head slider to deteriorate the tracking ability, conceivably the invention proposes to provide the IC chip having the read circuit or the write circuit on the side of the head slider. At least, the prior art does not disclose at all the positive aspect of installing an IC chip having only the read circuit on the side of the head slider.

Further, in those days when the aforementioned prior art was proposed, the IC was sealed in a resin package in general, and there was not available a recently developed mounting technique that does not use a package, such as the flip chip. Therefore, the weight of the present IC is considerably reduced, compared to the times of the application of the prior art, and it becomes less significant in view of the weight to divide the read write IC into an IC chip including the control circuit installed on the side of the movable arm and an IC chip having the write circuit or the read circuit installed on the side of the head slider. In short, it is reasonable to understand the prior art, from the spirit of the invention to reduce the load impedance, as a technique maintaining it desirable to install an IC chip including the write circuit and the read circuit on the side of the head slider, when the problem of the weight is resolved.

However, the inventors of the present invention found a further problem that the installation of an IC chip having the write circuit and the read circuit on the side of the head slider, accompanying the adoption of the flip chip mounting technique, does not very much aggravate the tracking ability of the head, however the power consumption in the chip increases and generates more heat, whereby a suspending part of the head retaining means thermally deforms to deteriorate the positioning accuracy. Concretely, first the reading is executed in the write mode, and the positioning of the head is executed on the basis of the signal readout, and then the writing is started; however, provided that the write circuit is installed near the head, a great amount of currents flows during the writing to raise the temperature of the chip, which leads to a fear of thermally deforming the head suspending part, and finally dislocating the head.

Especially in the flip chip mounting technique, the thermal capacity of a chip diminishes by the extent that the chip does not wear a package, and the thermal transmission between the chip and the head suspending part is bettered in comparison to an IC sealed in a package; and therefore, the head suspending part becomes still easier to thermally deform (stretch and shrink). The aforementioned prior art does not disclose at all a conception of dividing the chip from the viewpoint of the thermal deformation of the head suspending part, accompanied with a heat generated in the chip.

It is therefore an object of the invention to provide a storage media reading/writing system that prevents a thermal deformation of the head suspending part due to the write current, and achieves a highly accurate writing and reading.

Another object of the invention is to provide a storage media reading/writing system that permits the reading of data at a high speed without lowering the SN ratio.

Another object of the invention is to provide a storage media reading/writing system that permits the reading and writing of data at a high speed without a hindrance to the seek operation.

The foregoing and other objects and the novel features of the present invention will become apparent from the descriptions and the accompanying drawings of this specification.

The typical aspects of the invention disclosed in this application will be outlined as follows.

According to one aspect of the invention, the storage media recording/writing system includes a media drive circuit, a head retaining means, a head moving means, a head drive circuit, a signal processing circuit, and a controller. Further, the head drive circuit includes a first semiconductor integrated circuit having an amplifier that amplifies the read signal from the head, and a second semiconductor integrated circuit arranged between the first semiconductor integrated circuit and the signal processing circuit, which has a circuit that receives write data from the signal processing circuit and generates a drive signal to drive a write head. The head is mounted on the front of the head retaining means, and the first semiconductor integrated circuit is mounted on a part near the front, and the second semiconductor integrated circuit is installed on the side of the moving means.

According to the forgoing construction, the semiconductor integrated circuit to electrically drive the head is made up with two semiconductor integrated circuits, in which the first semiconductor integrated circuit having a read circuit is disposed on a part near the front of the head retaining means (arm), and the second semiconductor integrated circuit having a write circuit is disposed on the side of the head moving means (carriage). Therefore, if a write current flowing through the second semiconductor integrated circuit during writing raises a temperature of the chip, the head retaining means is unsusceptible to transmission of a heat, and is able to avoid a displacement of the head due to the heat generated. The construction also shortens the signal lines connecting the head and the semiconductor integrated circuit containing the read circuit to make the signal lines immune from noises, and thereby achieves a data reading at a high speed without deteriorating the SN ratio. Further, the semiconductor integrated circuit to electrically drive the head is constituted by two semiconductor integrated circuits, and one is mounted on the head retaining means (arm) and the other one is mounted on the head moving means (carriage); and accordingly, the system succeeds in restricting the weight increase of the semiconductor integrated circuit mounted on the arm to thereby achieve a high-speed reading and writing without a hindrance to the seek operation.

Further, when the head retaining means has an immovable part (base part) disposed near the moving means and a movable part (suspending part) disposed to face the recording media, it is preferable to install the first semiconductor integrated circuit on the movable part of the head retaining means. This construction shortens the distance between the head and the first semiconductor integrated circuit containing the read circuit, compared to a case of the first semiconductor integrated circuit being installed on the immovable part, and makes the read signal lines still more immune from noises.

Also, it is preferable to make up the immovable part of the head retaining means with a member of a high rigidity, and to make up the movable part with a thin plate member having a more elasticity than that of the immovable part. The front of the head retaining means is needed to deform, when the recording media rotates to generate a buoyancy acted on the head, and it is possible to use a head retaining member whose cross-sectional area decreases gradually toward the front; however, it is more advantageous in view of workability to make up the immovable part with a member of a high rigidity, and the movable part with a thin plate member having an elasticity.

According to another aspect of the invention, in the storage media recording/writing system, the first semiconductor integrated circuit and the second integrated circuit are connected with a bendable wiring cable, and the first semiconductor integrated circuit is coupled with the wiring cable through bumps of a fusible metal on a specific position thereof. This construction allows connection of the two semiconductor integrated circuits with a general-purpose cable such as a FPC, and facilitates the coupling of the cable and the first semiconductor integrated circuit, thus achieving reduction of the cost.

According to another aspect of the invention, the head is driven by a voltage signal from the write circuit provided in the second integrated circuit. The drive of the head by the voltage signal permits lowering the output impedance of the write circuit, thereby enhancing the settling of the current flowing through the head, and achieving a high-speed writing.

According to another aspect of the invention, the circuit to generate the drive signal supplied to the head for writing includes a resistor for an impedance matching that has the same resistance as the characteristic impedance of a wiring to connect the head and the second semiconductor integrated circuit. This construction prevents a signal reflection at the end of the signal line to achieve a high-speed writing. Here, the resistor for the impedance matching is preferably configured with a variable resistor such that the resistance can be adjusted. Thereby, if the length of the wiring to connect the head and the second semiconductor integrated circuit containing the write circuit and the type of the cable used are different in the system, the resistance can be adjusted to overcome the differences.

According to another aspect of the invention, on the first semiconductor integrated circuit, the bumps for terminals connecting with the second semiconductor integrated circuit are arrayed along one side of a chip on which the first semiconductor integrated circuit is formed, and the bumps for terminals connecting with the head are arrayed along the other side of the chip. Further, two rows of the bumps are mounted on the wiring cable along the cross direction thereof. Thereby, the breadth of the wiring cable can be reduced, compared with a case of the bump rows arrayed along the longitudinal direction of the cable.

According to another aspect of the invention, the first semiconductor integrated circuit includes a compensation circuit that compensates a deterioration of a frequency characteristic of a gain and a bandwidth, accompanied with dispersions of the resistance of the head. This restricts a deterioration of the frequency characteristic of the gain and the bandwidth, even if there are dispersions of the resistance of the head.

According to another aspect of the invention, the first semiconductor integrated circuit and the second semiconductor integrated circuit are connected to each other with two power supply lines and two transmission lines. This construction reduces the number of the signal lines, and achieves a further weight reduction of the head retaining means to realize a smooth and accurate seek operation of the arm.

According to another aspect of the invention, the head is configured with a read head and a write head. The employment of a head suitable for reading and a head suitable for writing allows a high-speed reading/writing and a high-accuracy reading/writing.

Further, preferably the first semiconductor integrated circuit and the second semiconductor integrated circuit are connected to each other only with two power supply lines and two transmission lines. This facilitates the assembly work of the head, and further reduces the weight of the arm that retains the head, which effects a further smooth and accurate seek operation of the arm.

According to another aspect of the invention, when the system incorporates a plurality of the heads, a plurality of the first semiconductor integrated circuits are provided corresponding to the number of the heads, and the second semiconductor integrated circuit is provided as a common circuit to a plurality of the first semiconductor integrated circuits. This reduces the number of the chips constituting the system, and facilitates the assembly.

BRIEF DESCRIPTION OF THE DRAWINGS

FIG. 8(A), FIG. 8(B), FIG. 8(C), and FIG. 8(D) are circuit diagrams illustrating concrete configurations of amplifiers and logic gates constituting the superimposed pulse generation circuit;

FIG. 21 is a timing chart illustrating the timings of signals supplied to the control chip from the system controller in the storage media reading/writing system to which the invention is applied;

DESCRIPTION OF THE PREFERRED EMBODIMENTS

Preferred embodiments of the invention will now be described on the basis of the accompanying drawings.

Figure 1:
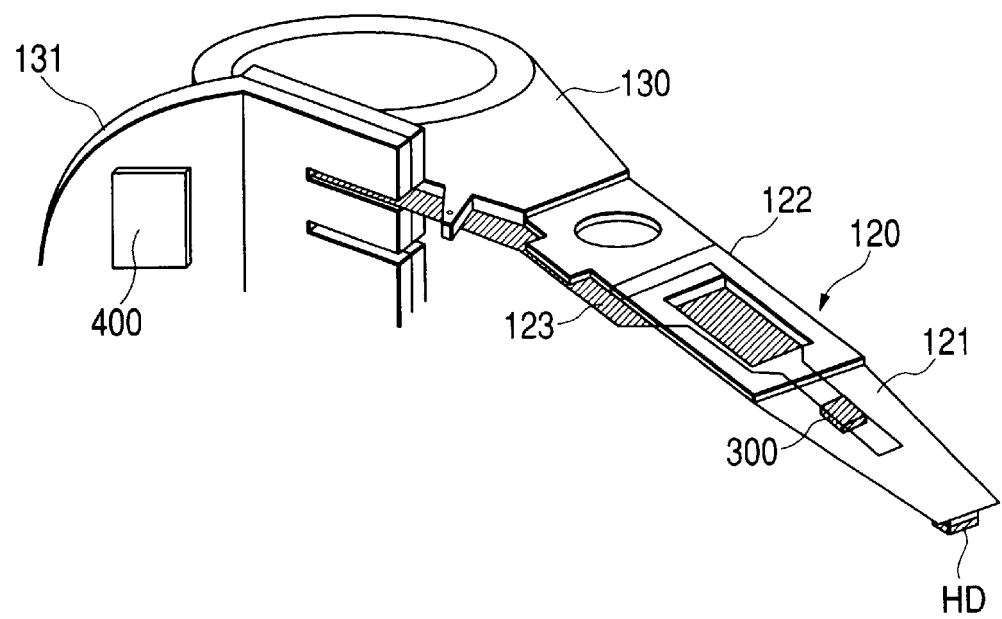
FIG. 1 is a perspective view illustrating a construction of an arm of a hard disk drive to which the present invention is applied.
Figure 23:
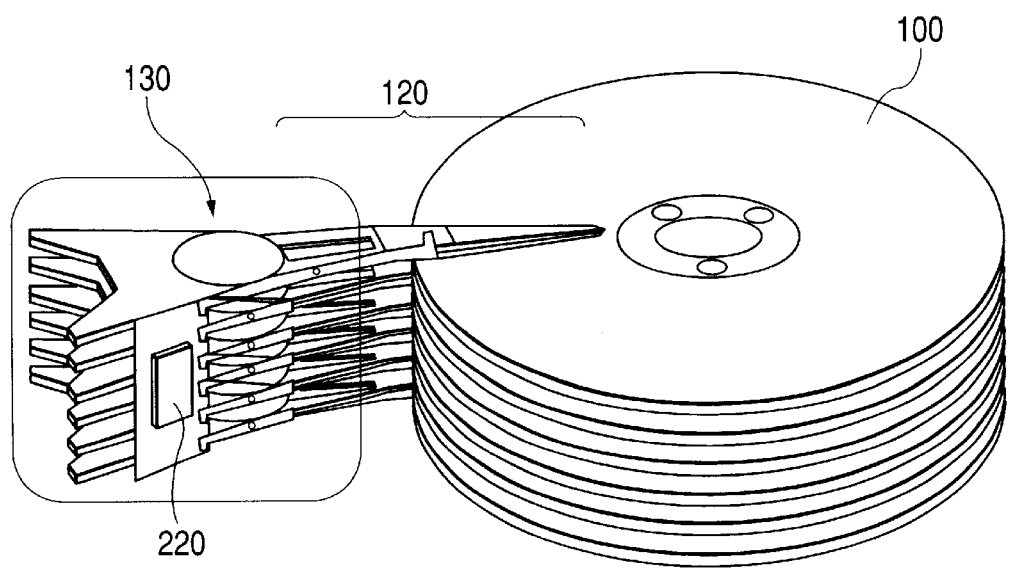
FIG. 23 is a perspective view illustrating a partial construction of the arm and the carriage of the hard disk drive to which the invention is effectively applied.

FIG. 1 illustrates a construction of an arm of the hard disk drive to which the present invention is applied. In FIG. 1, 120 denotes an arm having a magnetic head HD on the front, this arm is comprised of an elastic metal suspending part 121 and a base 122 to support the suspending part 121, and the magnetic head HD is mounted on the front of the suspending part 121, namely, on the underside of the end on the opposite side of the base 122. The base end of the base 122, namely, the end on the opposite side of the suspending part 121 is fastened to a carriage 130 as a moving means that moves the arm in the radial direction of a disk by a voice coil motor having a swingable structure, not illustrated. Here, FIG. 1 shows only one of the arms 120, but plural arms are provided in the same manner as in FIG. 23. Further, although not clear on the drawing, the magnetic head HD on the front of each arm is comprised of a pair of the reading and writing heads.

In this embodiment, the function of the conventional semiconductor integrated circuit called the read write IC, which is mounted on the carriage, is divided into a front chip 300 having a read circuit (read amplifier) that amplifies a read signal as a major role, and a control chip 400 including a write circuit (write amplifier) that drives the head by a write signal and a control circuit that controls the write circuit and the read circuit in the foregoing front chip. The front chip 300 is attached virtually on the center of the suspending part 121 on the front side of the arm. Although the front chip 300 may be attached at any position on the suspending part 121, a position as close to the front as possible is preferable in order to shorten the distance to the head.

In this embodiment, the arm 120 that supports the magnetic head HD is described to include the suspending part 121 and the base 122, however the structure of the arm 120 is not limited to the above construction. For example, it may be a sheet of plate that gradually thins toward the front end, that is, a structure in which the suspending part cannot clearly be distinguished from the base. Also, in the arm of such a structure, the front chip 300 is to be attached to a movable part near the front of the arm, which easily deforms by the buoyancy acting on the head during rotation of the disk.

On the other hand, the control chip 400 is attached to a plate 131 provided on a side face of the carriage 130, and the head HD, the front chip 300, and the control chip 400 are connected by way of a FPC 123. Although not especially restricted, the control chip 400 is connected to front ICs for the plural channels that are provided on the plural arms each, so that the one control chip can control the plural front chips.

As mentioned above, the front chip 300 located near the head contains the read circuit, which shortens the wiring connecting the front chip 300 and the head HD, and makes it difficult to pick up noises from the outside, thus achieving the reading at a high speed with low noises. Also, the write circuit is installed in the control chip 400 on the side of the carriage 130, and accordingly, the power consumption, namely, the heat generation in the front chip 300 is reduced in comparison to a case of the write circuit being installed in the front chip 300, which makes it possible to restrain the suspending part 121 from deforming. In case of writing data at a desired position on the magnetic disk 100, before writing the concerned data, data are read from the magnetic disk to attain the position of the head HD, and after moving the head HD to the desired position, the writing of the concerned data is carried out. Therefore, if a heat generated by the writing of data before the concerned data gives a deformation to the suspending part, it will become difficult to attain a correct head position in the reading operation performed to write the concerned data, and it will become difficult to write the concerned data into the correct position. According to this invention, the deformation of the suspending part by the heat generation can be restrained, and the writing of data into the correct position becomes possible. Further, this embodiment employs the voltage drive method for driving the write head by the write circuit, which will be described later, in replacement of the conventional general current drive method, thereby restraining the power consumption. Moreover, the embodiment provides in the control chip the resistors to match the impedance of a transmission line to thereby suppress the reflection of signals at the ends of the transmission line, thus achieving a high-speed writing.

Figure 2:
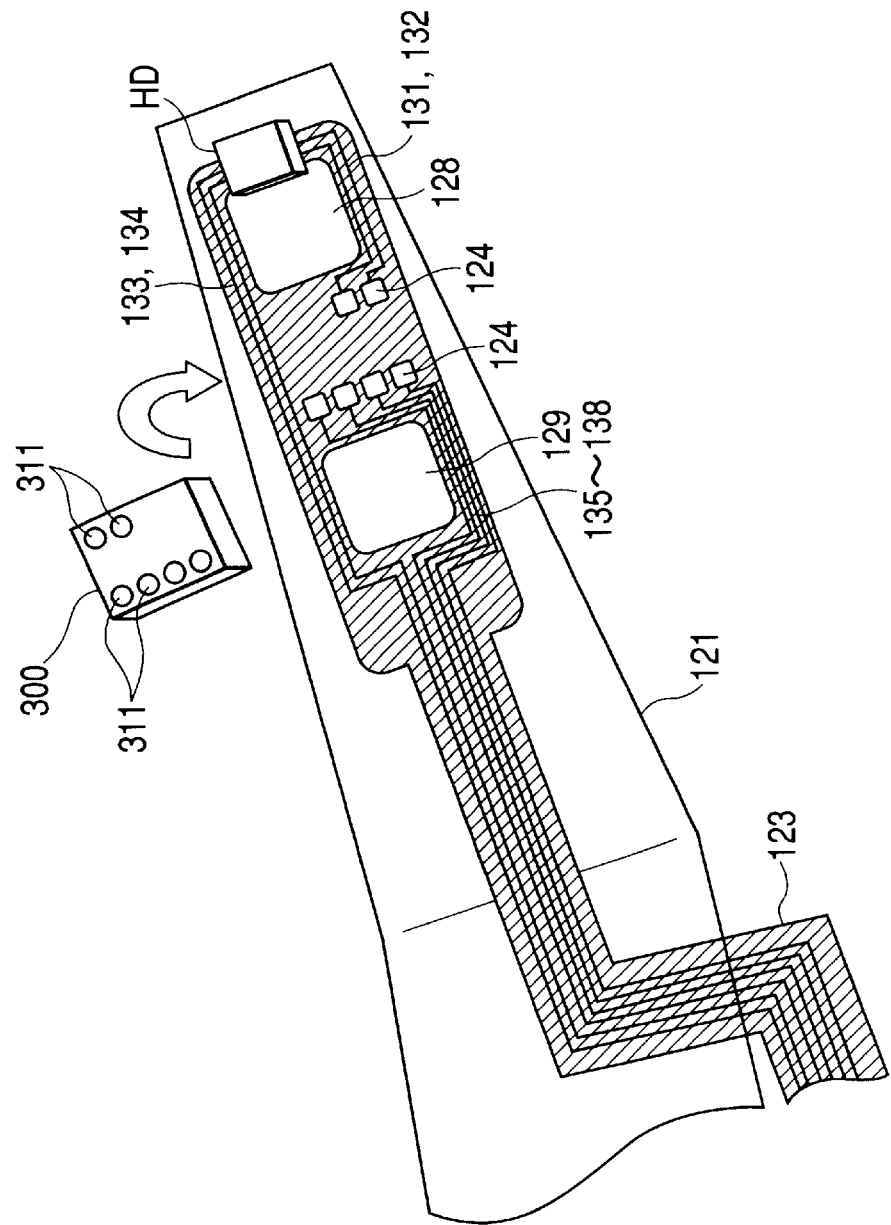
FIG. 2 is a perspective view illustrating a detailed mounting structure of a front chip.

Further, in this embodiment, the front chip 300 is mounted in a state of the flip chip that is not sealed in a package, thereby achieving a weight reduction of the chip. FIG. 2 illustrates a detailed mounting structure of the front chip 300. Here, the flip chip signifies the generally called bare chip, which includes the chip wearing on its surface an insulating film formed by the semiconductor manufacturing process, such as a passivated film. Further, it should be understood that the chip includes the one being in a state of a flip chip during mounting, being molded with a resin or the like after mounted on the suspending part 121.

In FIG. 2, the FPC 123 is adhered on a surface of the suspending part 121, and the magnetic head HD is mounted on the front of the FPC 123. Bumps 311 made of a fusible metal such as a solder are formed on the front chip 300. Further, electrode pads 124 for mounting the front chip 300 are formed in correspondence with the layout of the bumps 311 of the front chip 300, on the FPC 123 at a position slightly near the center from the front of the suspending part 121. The front chip 300 is mounted on the FPC 123 in the following manner: to bring the bumps 311 of the front chip 300 into contact with the corresponding electrode pads 124 on the FPC 123, to press the chip onto the FPC while heating, and to thermally bond it on the FPC by the face-down method.

In the embodiment, the bumps are formed on the front chip 300, however they may be formed on the FPC 123; or, the front chip may be thermally bonded on the FPC in such a manner that solder balls are applied on the electrode pads 124 of the FPC 123, the corresponding electrode pads on the front chip 300 are covered from above so as to come into contact with the solder balls on the electrode pads 124, and the chip is pressed onto the FPC during heating. Alternatively, the front chip 300 being adhered on the surface of the suspending part 121 may be mounted on the FPC 123. Alternatively, it may be arranged such that the front chip 300 is mounted on the FPC 123, and thereafter the FPC 123 with the front chip mounted is adhered on the surface of the suspending part 121.

The magnetic head HD is comprised of a write head for writing and an MR head for reading, which is not clear in FIG. 2. The MR head for reading and the front chip 300 are connected by means of two wirings 131, 132 that are provided on the FPC 123. The write head is connected directly to the control chip 400 by means of two wirings 133, 134 that are provided on the FPC 123. The front chip 300 is connected to the control chip 400 by means of four wirings 135 to 138 that are provided on the FPC 123. Two of the four wirings 135 to 138 between the front chip 300 and the control chip 400 are used for the power supply, and the remaining two are used for the transmission of read data signals and control signals.

Further in this embodiment, with regard to the bumps 311 of the front chip 300, the bumps for the terminals connected with the control chip 400 are arranged along one side of the chip, and the bumps for the terminals connected with the head are arranged along the other side of the chip, which is seen in FIG. 2. The electrode pads 124 are arranged along the direction perpendicular to the longitudinal direction of the FPC 123, so that the two rows of the bumps can be mounted along the cross direction of the FPC 123. Thereby, the breadth of the FPC 123 can be reduced. Provided that the electrode pads 124 are arranged along the longitudinal direction of the FPC 123, the wirings 135 to 138 being connected to these pads have to be formed to make detours on the outside of the pads, so that the breadth of the FPC 123 will be extended. The layout as shown in FIG. 2 can make the breadth of the FPC 123 narrower. Also, the lengths of the wirings 131, 132 between the head HD and the front chip 300 can be made shorter, whereby the wirings become difficult to pick up noises.

Further, the FPC 123 has punched windows 128, 129 formed. This leads to the weight reduction of not only the FPC but also the arm. Further, in FIG. 2, the wirings 133, 134 that connect the write head to the control chip 400 are placed to detour the mounting place of the front chip 300, however they may be placed beneath the chip mounted, that is, to pass through the pads 124. Thereby, the breadth of the FPC 123 can be made still narrower.

Figure 3:
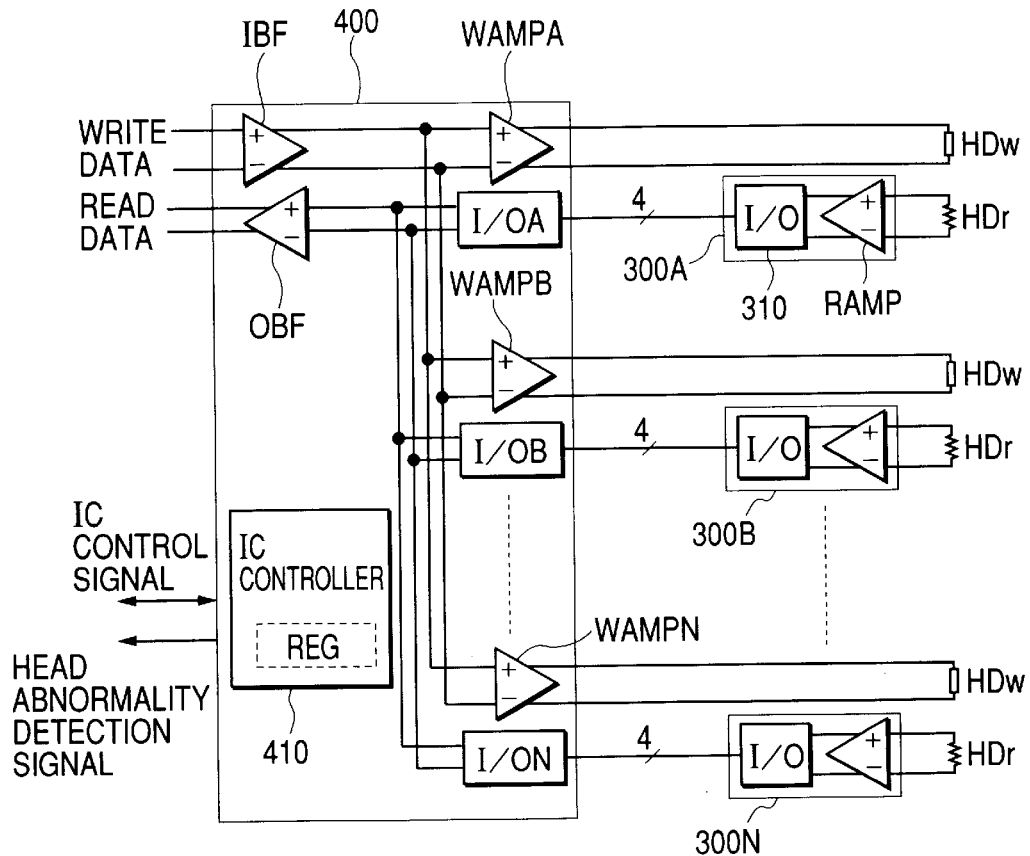
FIG. 3 is a block diagram illustrating a schematic configuration and connection of the front chip and a control chip.

FIG. 3 illustrates a schematic configuration and connection of the front chip 300 and the control chip 400.

In FIG. 3, 300A, 300B, . . . , 300N denote the front chips that are each mounted on the individual arms, HDr denotes a read head, made up with an MR head (Magneto-Resistance head), and HDw denotes a write head. Each of the front chips 300 includes a read amplifier RAMP connected to the read head HDr, an interface unit 310 that that sends and receives signals to and from the control chip 400, a control unit and a head abnormality detection circuit and so forth, not illustrated. In this embodiment, the read head HDr is connected to the front chip 300, and the write head HDw is connected to the control chip 400.

The control unit integrated in the front chip 300, with a control register contained, executes: controlling the operational timings of the circuits inside the chip in accordance with the contents set in this register, controlling the bias current in the read amplifier RAMP, controlling the reception and transmission of signals to and from the control chip 400, setting a signal from the control chip 400 into the control register, determining abnormality based on a signal detected by the abnormality detection circuit, and controlling the output thereof and so forth.

The control chip 400 includes write amplifiers WAMPA, WAMPB, . . . , WAMPN connected to the write heads HDw, interface units I/OA, I/OB, . . . , I/ON that send and receive signals to and from the front chips 300A, 300B, . . . , 300N, an input buffer IBF and an output buffer OBF that send and receive signals to and from the host signal processing LSI called a data channel processor, and a control circuit 410 that receives control signals from a microcomputer as the system controller and controls the circuits inside the chip. The control circuit 410 is provided with a register REG for setting the operation mode and so forth.

The interface units I/OA, I/OB, . . . , I/ON of the control chip 400 are each connected correspondingly to the interface units 310 of the front chips 300A, 300B, . . . , 300N, with four transmission lines each. The two of the four lines are used as the Vcc supply line for nearly +3 Volts and the Vee supply line for nearly −3 Volts. The remaining two lines transmit read data from the front chip 300 to the control chip 400, and transmit signals for setting the control contents and so forth from the control chip 400 to the control register inside the front chip 300.

Incidentally, the technique to transmit the read data from the front chip 300 to the control chip 400 or to transmit the control signals from the control chip 400 to the front chip 300 by using common signal lines has been disclosed in the Japanese Published Unexamined Patent Application No. 2000-307850, which the inventors applied precedently, and the description of the concrete circuit thereof will be omitted.

Next, the embodiments of the write circuits including the write amplifiers incorporated in the control chip 400 will be described with reference to FIG. 4 through FIG. 14.

Figure 4:
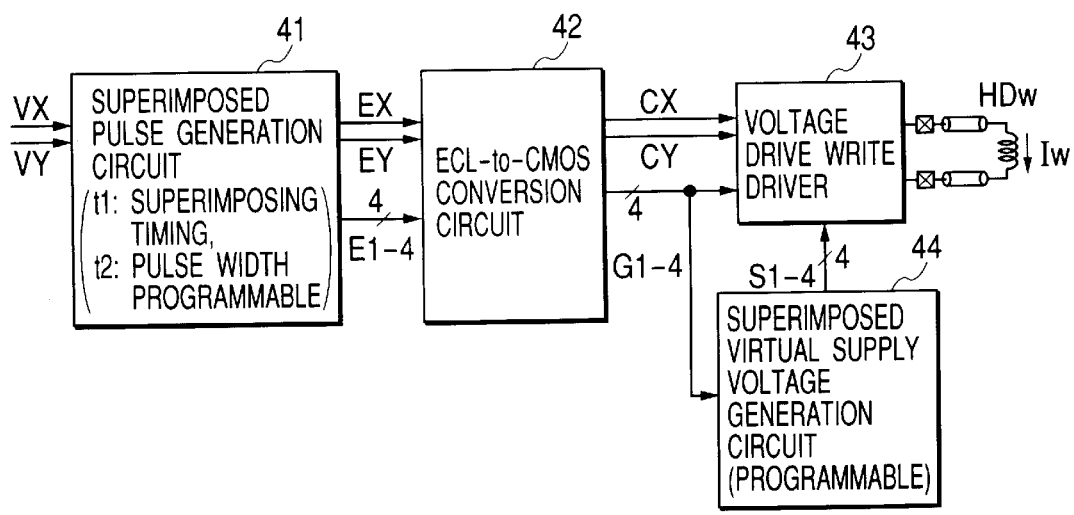
FIG. 4 is a block diagram illustrating a schematic configuration of a write circuit.
Figure 5:
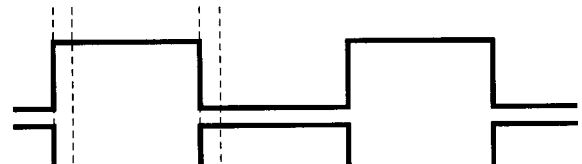
FIG. 5(A) through FIG. 5(H) is a timing chart illustrating the timings of the write currents outputted from the write circuit and the pulses generated in the write circuit.
Figure 6:
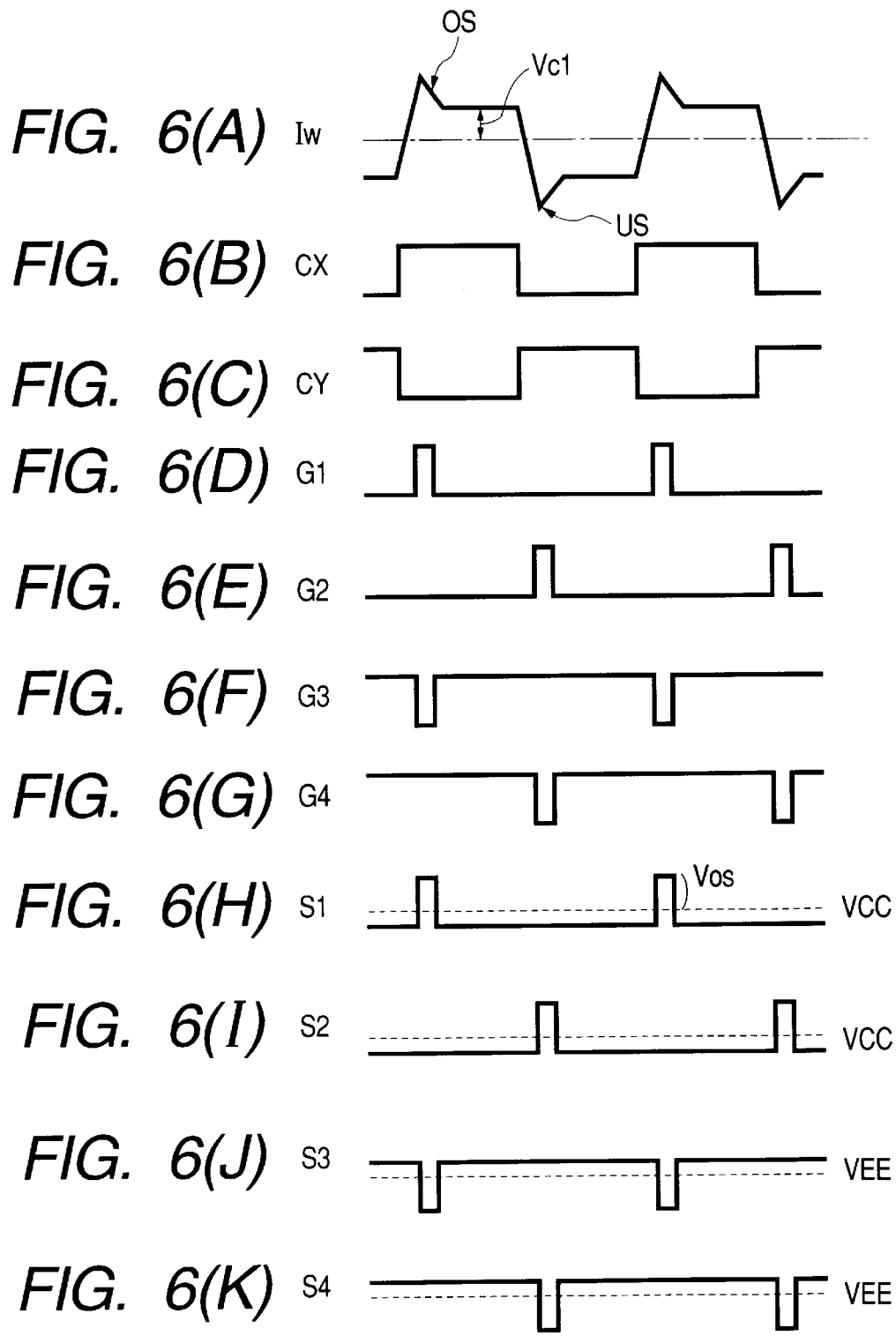
FIG. 6(A) through FIG. 6(K) is a timing chart illustrating the timings of the pulses generated in a superimposed pulse generation circuit constituting the write circuit.

FIG. 6(A) illustrates a waveform of a write current Iw to be flowed into the write head HDw; and FIG. 4 illustrates a schematic configuration (block diagram) of the write circuit including the write amplifier that flows the write current Iw into the write head HDw. The write circuit in this embodiment applies a voltage synthesized with the pulses as in FIG. 6(B) and FIG. 6(C) and the pulses as in FIG. 6(H) through FIG. 6(K) to the write head HDw, and thereby flows the write current Iw as shown I FIG. 6(A).

Therefore, the write circuit in this embodiment includes a superimposed pulse generation circuit 41 that generates superimposed pulses EX, EY, E1, E2, E3, E4 as shown in FIG. 5(C) to FIG. 5(H) on the basis of write signals VX, VY as shown in FIG. 5(A), FIG. 5(B), a level conversion circuit 42 that converts the pulses EX, EY, E1 to E4 having the amplitudes of the ECL level into pulses CX, CY, G1 to G4 having the amplitudes of the CMOS level, a write driver 43 as a write amplifier that drives the write head HDw by the voltage, and a superimposed virtual supply voltage generation circuit 44 that generates drive voltages S1 to S4 that are stepped up as shown in FIGS. 6(H) to 6(K) and required by the write driver 43, on the basis of the pulses G1 to G4 supplied from the level conversion circuit 42.

Figure 7:
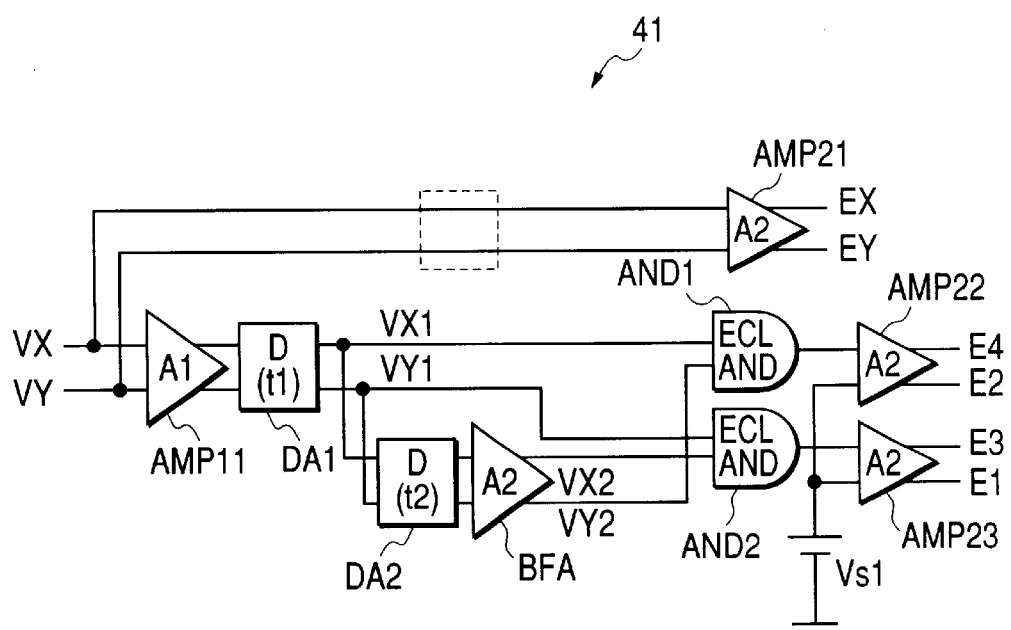
FIG. 7 is a circuit diagram illustrating a concrete configuration of the superimposed pulse generation circuit constituting the write circuit.

FIG. 7 illustrates a concrete configuration of the superimposed pulse generation circuit 41 constituting the write circuit. The superimposed pulse generation circuit 41 in this embodiment includes an input differential amplifier AMP11 as the input stage, delay amplifiers DA1, DA2, a buffer amplifier BFA, logical product gates AND1, AND2 that generate one-shot pulses according to the rise and fall of the input pulses VX, VY, and output differential amplifiers AMP21 to AMP23 that constitute the output stage. The pulses E1 and E3 are the positive and negative pulses that are generated in accordance with the rise of the input pulse VX, and the pulses E2 and E4 are the positive and negative pulses that are generated in accordance with the fall of the input pulse VX, respectively.

FIG. 8(A) illustrates a concrete circuit example for the logical product gates AND1, AND2; FIG. 8(B) a concrete circuit example for the input differential amplifier AMP11 and the buffer amplifier BFA; FIG. 8(C) a concrete circuit example for the output differential amplifiers AMP21 to AMP23; and FIG. 8(D) a concrete circuit example for the delay amplifiers DA1, DA2.

The delay amplifier DA1 is a circuit for setting a phase difference t1 between the output pulses EX, EY corresponding to the input pulses VX, VY and the one-shot pulses E1 to E4 superimposed on the output pulses EX, EY, and the delay amplifier DA2 is a circuit for setting a pulse width t2 of the one-shot pulses E1 to E4; as shown in FIG. 8(D), the delay amplifier has capacitors DC1, DC2 connected between the bases of the output emitter-follower transistors Q1, Q2 and the supply voltage Vcc, and an appropriate selection of the capacitance values of these capacitors DC1, DC2 will set the delay time of the amplifier.

Now, the delay amplifier DA1 may be inserted between the input differential amplifier AMP11 and the output differential amplifier AMP21, as shown by the dotted line in FIG. 7. In this case, the phase difference t1 between the output pulses EX, EY and the one-shot pulses E1 to E4 is determined by a difference between the delay time of the delay amplifier DA1 and the delay time of the input differential amplifier AMP11 and the logical product gate AND1. Although this case slightly complicates the designing of the delay time of the delay amplifier DA1, the insertion of the delay amplifier in the dotted-line place uniforms the numbers of the stages from the input terminals to the output terminals; accordingly, the phase difference t1 will not be dispersed, even if there occur device dispersions due to the process dispersions or device characteristic dispersions due to the process temperature variations, which is advantageous. Here, the differential amplifier and the emitter-follower each are assumed to take the one-stage configuration.

Figure 9A:
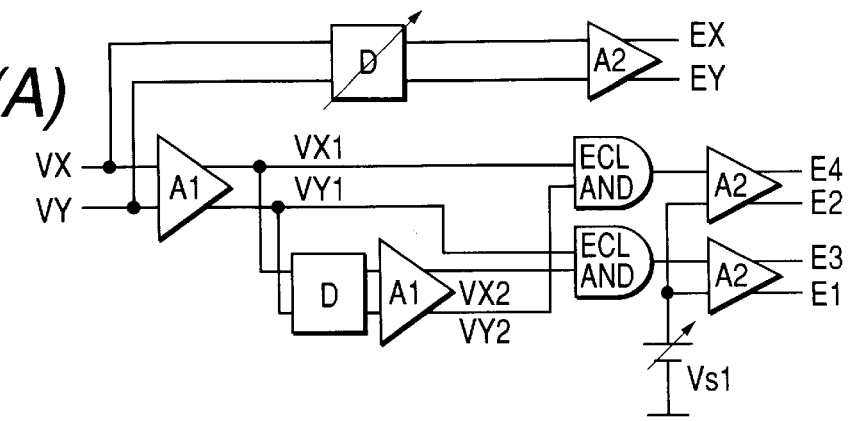
FIG. 9(A), FIG. 9(B), and FIG. 9(C) are circuit diagrams illustrating modified configurations of the amplifiers constituting the superimposed pulse generation circuit.

The superimposed pulse generation circuit 41 in FIG. 7 fixes the timings and pulse widths of the pulses generated; however, as shown in FIG. 9(A), an employment of a variable delay amplifier for the delay amplifier DA1, and an employment of a variable voltage circuit for the constant voltage circuit Vs1 that is given to the reference voltage terminals of the output amplifiers AMP 22, AMP23 will enable the adjustment of the timings and pulse widths of the pulses generated.

Figure 9B:
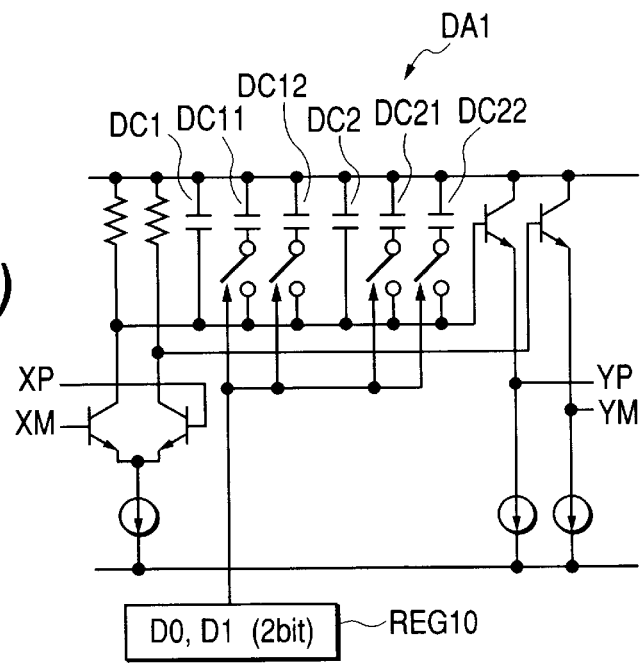

FIG. 9 (B) illustrates a concrete circuit example for the delay amplifier DA1 capable of varying the delay, which annexes capacitors DC11, DC12; DC21, DC22 in parallel to the capacitors DC1, DC2 in FIG. 8(D), and switches in series to these capacitors. The delay is adjusted such that the control circuit changes the setting values of the register REG 10 to switch the ON/OFF state of the switches, to thereby change the capacitances.

Figure 9C:
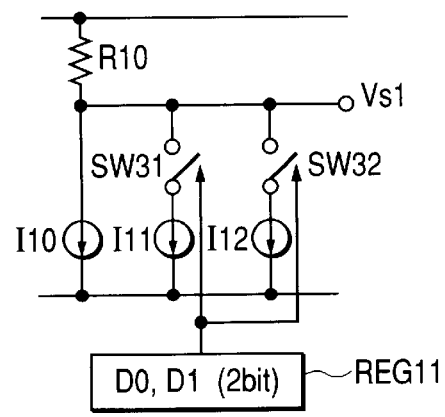

FIG. 9(C) illustrates a concrete circuit example for the variable voltage circuit capable of varying the constant voltage Vs1 that is given to the reference voltage terminals of the output amplifiers AMP22, AMP23, which includes a resistor R10 and a constant current source I10 in series, plural constant current sources I11, I12 provided in parallel to the constant current source I10, and switches SW31, SW32 connected in series to the constant current sources I11, I12. The constant voltage Vs1 is adjusted such that the control circuit changes the setting values of the register REG 11 to switch the current flowing through the resistor R10.

Figure 10A:
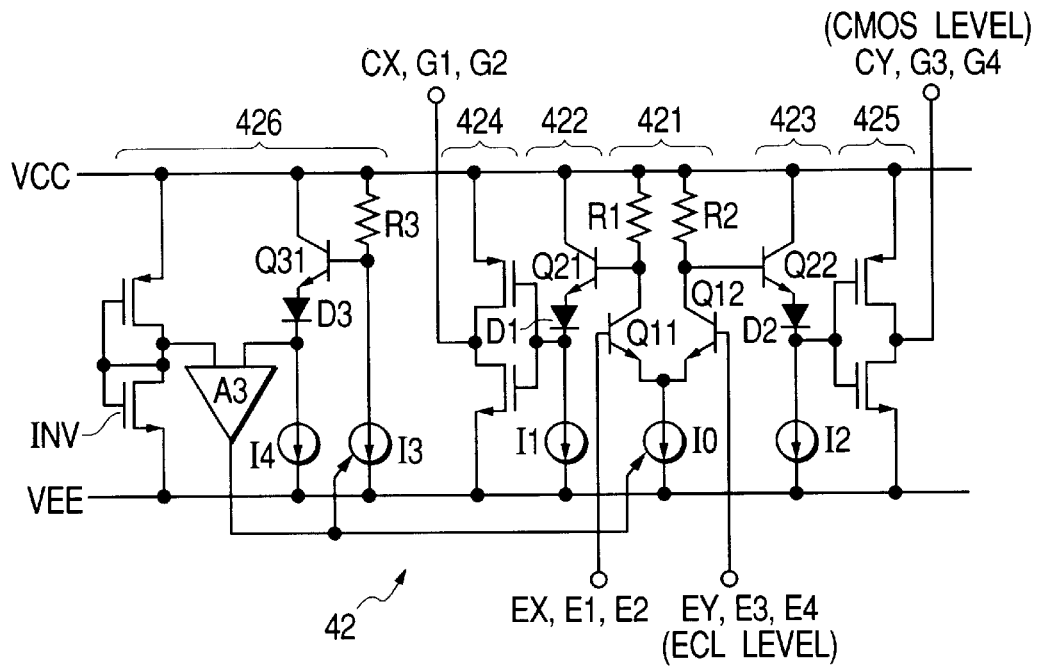
FIG. 10(A) and FIG. 10(B) are circuit diagrams illustrating concrete configurations of a level conversion circuit constituting the write circuit.

FIG. 10 illustrates a concrete circuit example for the level conversion circuit 42 constituting the write circuit. The level conversion circuit 42 in this embodiment comprises, as shown in FIG. 10(A), a level shift circuit that includes: a differential input stage 421 comprised of emitter-coupled transistors Q11, Q12, load resistors R1, R2, and a constant current source I0; emitter-followers 422, 423 comprised of collector-grounded transistors Q21, Q22 whose bases are connected to the output nodes of the input stage 421, diodes D1, D2 connected to the emitters of the transistors Q21, Q22, and constant current sources I1, I2 connected in series to the diodes D1, D2; and a pair of CMOS inverters 424, 425 that receive cathode voltages of the diodes D1, D2 at their input terminals.

The level conversion circuit 42 in this embodiment further comprises a bias circuit 426 having a similar configuration to the forgoing level shift circuit, which generates a bias voltage for the constant current source I0 of the level shift circuit. Concretely, the bias circuit 426 is configured with: a circuit that connects a resistor R3 having half the resistance of the load resistors R1, R2 of the differential input stage 421 in series to a constant current source I3 to generate an average voltage of the base voltages of the emitter-follower transistors Q21, Q22; an emitter-follower including a transistor Q31 that receives the average voltage at its base, and a diode D3 and a constant current source I4 that are inserted between the emitter of the transistor Q31 and the power supply voltage VEE; a CMOS inverter INV whose input terminals and output terminals are directly coupled; and a differential amplifier A3 whose input terminals receive the output of the inverter and the output of the emitter-follower.

Figure 10B:
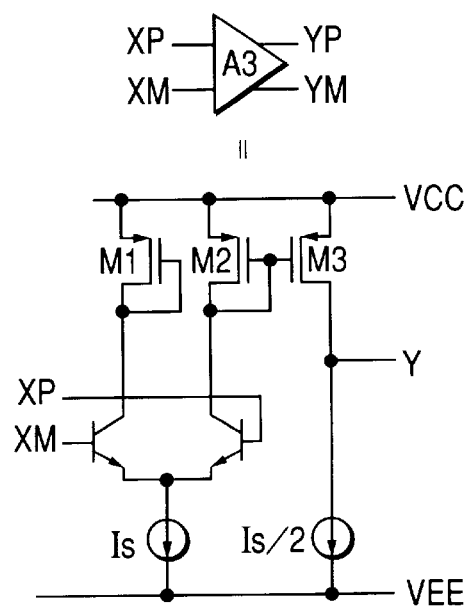

Further, as shown in FIG. 10(B), the differential amplifier A3 feeds back the output thereof to the constant current source I3 as a bias voltage, whereby the bias circuit 426 maintains the output of the CMOS inverter and the output of the emitter-follower on an identical level. The bias voltage is also applied to the constant current source I0 of the level shift circuit as the bias voltage. Thereby, the level shift circuit operates so as to bring the centers of the amplitudes of the amplified signals (the outputs of the emitter-follower 422, 423) into coincidence with the centers (logical thresholds) of the inputs of the CMOS inverters 424, 425. As the result, in the level conversion circuit 42, the duty ratio of the output pulse becomes coincident with the duty ratio of the input pulse.

The differential amplifier A3 of the bias circuit 426 is not limited to the circuit that is comprised of bipolar transistors and load MOSFETs, as shown in FIG. 10(B), but it may be a general differential amplifier that is comprised of bipolar transistors only or MOSFETs only. The circuit shown in FIG. 10(B) employs MOSFETs M1, M2 as the active load transistors, so that it can reduce errors by the base current in case of the bipolar transistors being used. Further, in the circuit shown in FIG. 10(B), the MOSFET M2 and a MOSFET M3 of the output stage form the current-mirror, instead of connecting the gates each of the active load MOSFETs M1, M2, and thereby the source-follower circuit of the MOS can be reduced for one stage, which is advantageous.

Figure 11A:
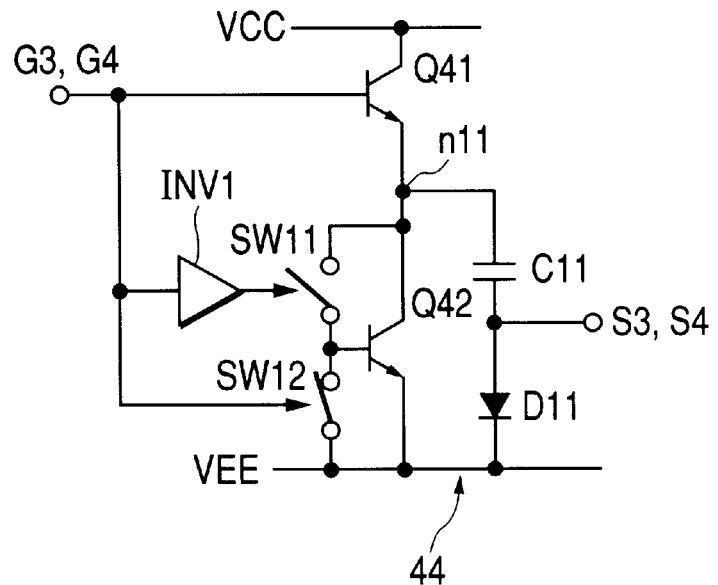
FIG. 11(A) and FIG. 11(B) are circuit diagrams illustrating concrete configurations of a superimposed virtual supply voltage generation circuit constituting the write circuit.
Figure 11B:
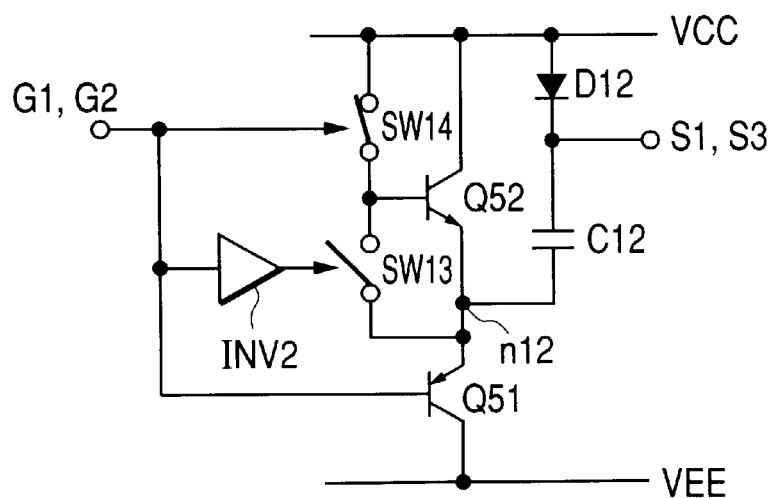

FIG. 11(A) and FIG. 11(B) illustrate concrete circuit examples for the superimposed virtual supply voltage generation circuit 44 constituting the write circuit. The circuit in FIG. 11(A) generates the pulses S3, S4 superimposed on the VEE side, as shown in FIG. 6(J), FIG. 6(K), and the circuit in FIG. 11(B) generates the pulses S1, S2 superimposed on the VCC side, as shown in FIG. 6(H), FIG. 6(I).

As shown in FIG. 11(A), the circuit that generates the VEE-side superimposed pulses includes: an npn bipolar transistor Q41 that receives the pulse G3 (or G4) from the level conversion circuit 42 at its base, an npn bipolar transistor Q42 connecting in series to Q41, a capacitor C11 and a forward diode D11 that are inserted in series between a connection node (n11) of Q41, Q42 and the power supply voltage VEE, switches SW11, SW12 that complementarily short-circuit the base and collector or the base and emitter of the transistor Q42 in accordance with the input pulse G3 or G4, and an inverter INV1 that inverts the input pulse G3 (or G4) and applies the inverted to the control terminal of the switch SW11.

This circuit turns ON the transistor Q41 and the switch SW12, and turns OFF the switch SW11, when the input pulse G3 (or G4) is in High level. At this time, the base and emitter of the transistor Q42 are short-circuited, so that the transistor Q42 functions as a reverse diode. Therefore, the node n11 to which the capacitor C11 is connected is charged up to nearly VCC level. Next, when the input pulse G3 (or G4) is changed into Low level, the transistor Q41 and the switch SW12 are turned OFF, and the switch Sw11 is turned ON. Now, the base and collector of the transistor Q42 are short-circuited, so that the transistor Q42 functions as a forward diode. Accordingly, the potential of the node n11 connecting the capacitor C11 is decreased to nearly VEE level, and in accordance with this, the potential of the other terminal of the capacitor C11 goes down. Accordingly, the output signal S3 (or S4) goes down to a voltage lower by (VCC−VEE−3VBE) than VEE. Here, VBE is the voltage between the base and emitter of a transistor.

The circuit shown in FIG. 11(B) has a similar configuration to the circuit shown in FIG. 11(A), where the potential relation is reversed, and the operation thereof is the same as that of the circuit shown in FIG. 11(A). This circuit turns ON the transistor Q51 when the input pulse G1 (or G2) is in Low level, and charges up the node n12 connecting the capacitor C12 to nearly VEE level. Next, when the input pulse G3 (or G4) is changed into High level, the transistor Q51 is turned OFF, and the base and emitter of the transistor Q52 are short-circuited, so that the transistor Q52 functions as a reverse diode. Accordingly, the potential of the node n12 connecting the capacitor C12 is increased to nearly VCC level, and in accordance with this, the potential of the other terminal of the capacitor C12 goes up. Accordingly, the output signal S1 (or S2) goes up to a voltage higher by (VCC−VEE−3VBE) than VCC.

Figure 12A:
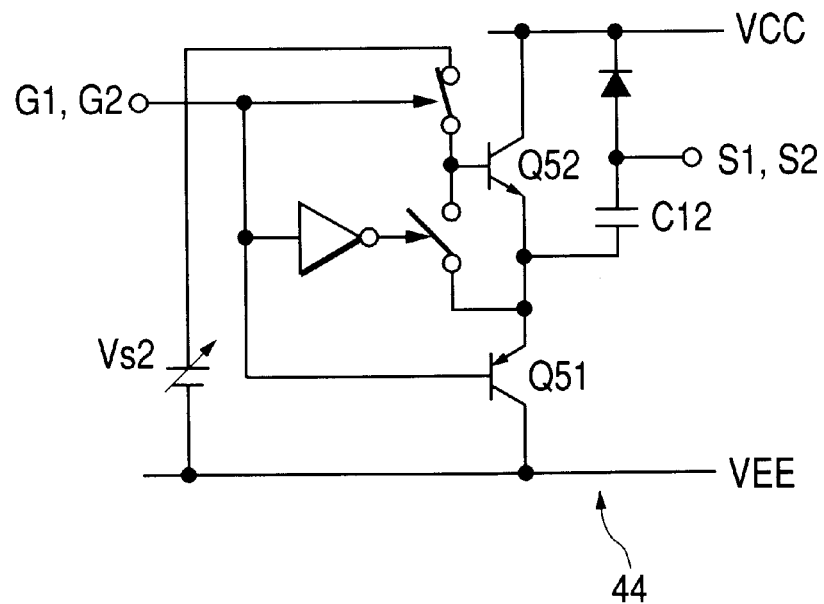
FIG. 12(A) and FIG. 12(B) are circuit diagrams illustrating modified configurations of the superimposed virtual supply voltage generation circuit constituting the write circuit.

Now, in the circuits in FIG. 11(A) and FIG. 11(B), the voltages applied to the transistors Q42, Q52 by way of the switches SW12, SW14 can take an arbitrary constant voltage in replacement of the power supply voltage VEE and VCC, and the value of the constant voltage determines the overshoot Vos of the output pulses S1 to S4. Furthermore, as shown in FIG. 12(A), an addition of a variable voltage source Vs2 to the circuit in FIG. 11(B) will make the overshoot Vos adjustable.

Figure 12B:
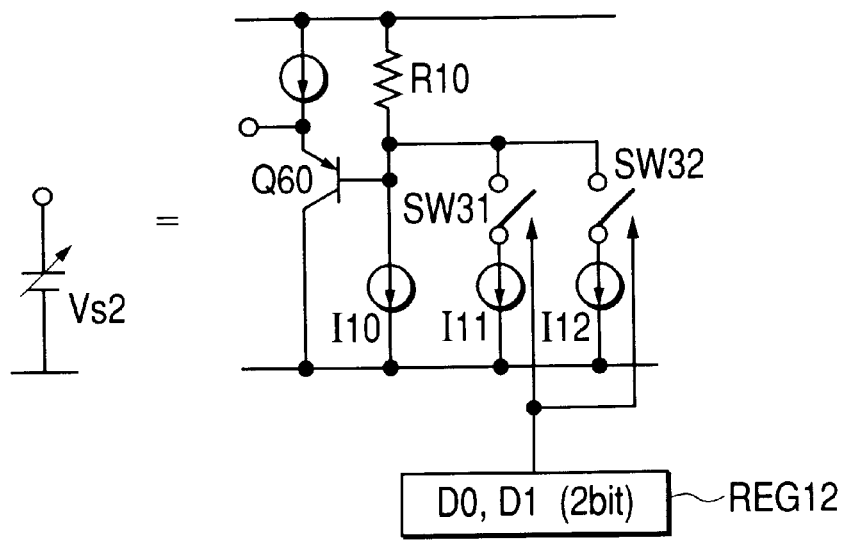

A concrete circuit for the variable voltage source Vs2 to make the overshoot Vos adjustable is shown in FIG. 12(B). This circuit includes plural constant current sources I10, I11, I12, switches SW31, SW32 connected in series to the current sources I12, I13, and a resistor R10 that the combined current of the current sources I10, I11, I12 flow through. The circuit switches the combined current flowing through the resistor R10 by changing the setting values of a register REG 12, and thereby varies the base bias voltage of a transistor Q60 to vary the output voltage. In the same manner, the circuit shown in FIG. 11(A) can be made adjustable in regard to the overshoot.

Figure 13:
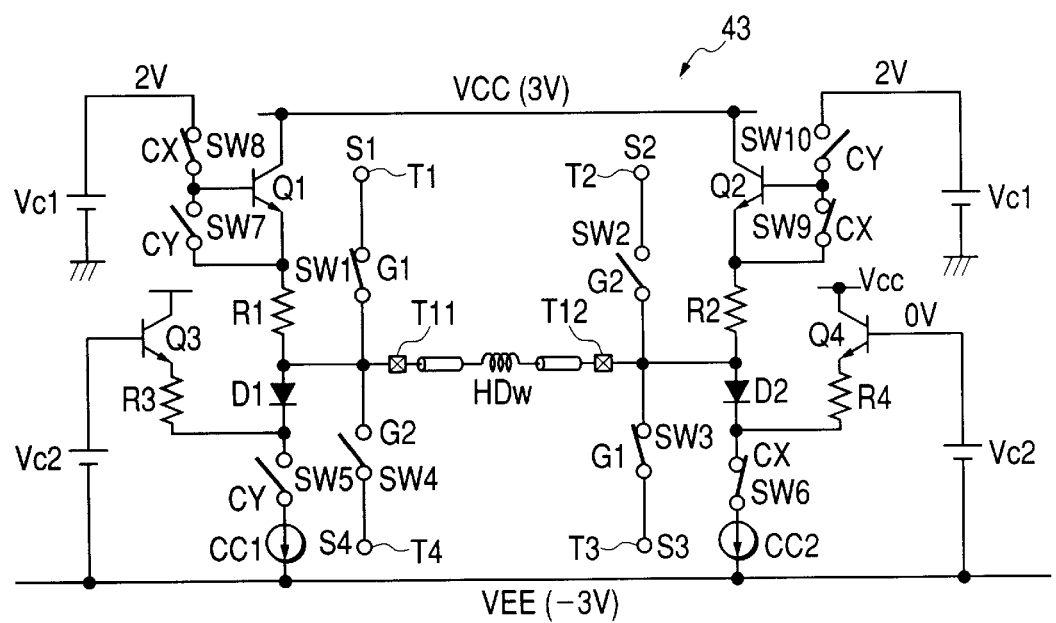
FIG. 13 is a circuit diagram illustrating a concrete configuration of a write drive circuit constituting the write circuit.

FIG. 13 illustrates a concrete circuit example for the write driver 43 constituting the write circuit. As shown in FIG. 13, the write driver in this embodiment includes: four terminals T1 to T4 that each receive the voltage pulses S1 to S4 generated by the superimposed virtual supply voltage generation circuit 44; two terminals T11, T12 each connecting to each of one ends of the two transmission lines whose the other ends are connected to each of the terminals of the write head HDw; and four switches SW1 to SW4 each inserted between the four terminals T1 to T4 and the two terminals T11, T12. Of these four switches, the switches SW1, SW3 are controlled on and off by the pulse G1 supplied from the level conversion circuit 42, and the switches SW2, SW4 are controlled on and off by the pulse G2.

Further, the write driver in this embodiment includes: transistors Q1, Q2, Q3, Q4 of which collectors are connected to the supply voltage VCC; a resistor R1, a diode D1, a switch SW5, and a constant current source CC1 that are connected in series to Q1; a resistor R2, a diode D2, a switch SW6, and a constant current source CC2 that are connected in series to Q2; a resistor R3 connected between the emitter of Q3 and the cathode of D1; a resistor R4 connected between the emitter of Q4 and the cathode of D2; a switch SW7 connected between the base and the emitter of Q1; a switch SW8 and a constant voltage source Vc1 that are inserted in series between the base of Q1 and the ground potential; a constant voltage source Vc2 connected between the base of Q3 and the supply voltage VEE; a switch SW9 connected between the base and the emitter of Q2; a switch SW10 and the constant voltage source Vc1 that are inserted in series between the base of Q2 and the ground potential; and the constant voltage source Vc2 connected between the base of Q4 and the supply voltage VEE. The constant voltage source Vc1 takes a voltage somewhere around 2 volts, and the constant voltage source Vc2 takes a voltage such as 3 volts.

Further, the switches SW5, SW7, SW10 are controlled on and off by the pulse CY supplied from the level conversion circuit 42, and the switches SW6, SW8, SW9 are controlled on and off by the pulse CX supplied from the level conversion circuit 42. As shown in FIG. 6(B), FIG. 6(C), since the pulse CX is in reverse to the pulse CY, when the pulse CX is turned into High level, the switches SW6, SW8, SW9 are turned ON, the transistor Q1 is made conductive, and the transistor Q2 functions as a reverse diode. Therefore, a current starts flowing through the head connection terminal T11 toward the terminal T12. Here, the transistor Q4 is turned ON so that the potential of the head connection terminal T12 does not excessively drop. Further, the base potential difference Δ V of the transistors Q1 and Q3 determines the height of the flat portion of the write current waveform Iw in FIG. 6(A) (ΔV=Vc1, if Vc2=0 volt).

Further, after a specific delay time from when the transistor Q1 is turned ON and the current starts flowing through the head connection terminal T11 toward the terminal T12, the switches SW1, SW3 are turned ON, and in addition the pulse S1 higher than VCC is applied to the terminal T1 and the pulse S3 lower than VEE is applied to the terminal T3. As the result, the over-shooting write current Iw as illustrated by the symbol OS in FIG. 6(A) flows through the write head HDw. At this moment, the transistor Q4 has a reverse bias voltage applied to become OFF.

On the other hand, when the pulse CY is turned into High level, the switches SW5, SW7, SW10 are turned ON, the transistor Q2 is made conductive, and the transistor Q1 functions as a reverse diode. Therefore, a current starts flowing through the head connection terminal T12 toward the terminal T11; and after a specific delay time the switches SW2, SW4 are turned ON, and in addition the pulse S2 higher than VCC is applied to the terminal T2 and the pulse S4 lower than VEE is applied to the terminal T4. As the result, the under-shooting write current Iw as illustrated by the symbol US in FIG. 6(A) flows through the write head HDw.

Further, the write driver 43 in this embodiment sets the values of the resistors R1 to R4 to match the impedances of the transmission lines that connect between the terminals of the write head HDw and the connection terminals T11, T12; and thereby it prevents the reflection of the write voltage at the terminals T11, T12.

Figure 14A:
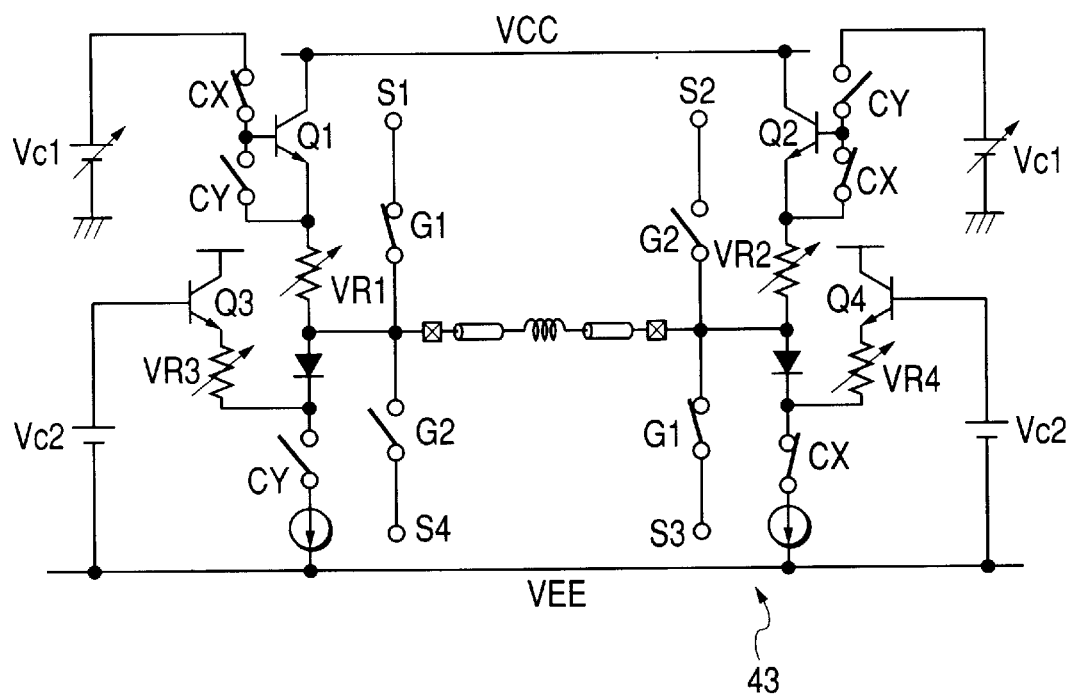
FIG. 14(A) and FIG. 14(B) are circuit diagrams illustrating modified configurations of the write drive circuit constituting the write circuit.
Figure 14B:
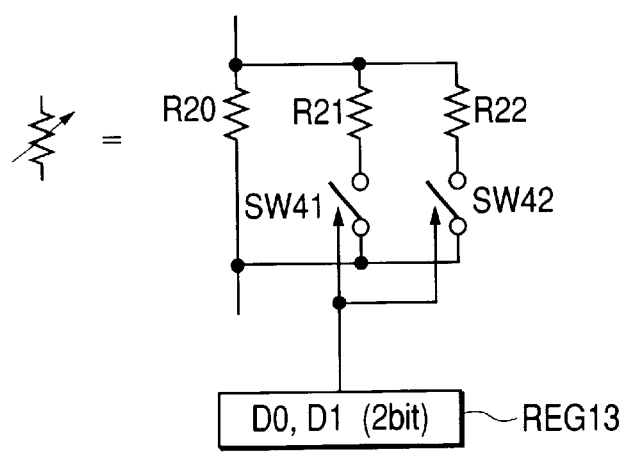

The impedances of the transmission lines that connect between the terminals of the write head HDw and the connection terminals T11, T12 can be slightly different, depending on the distance from the chip to the head or the FPC used. Accordingly, as shown in FIG. 14(A), variable resistors VR1 to VR4 are adopted in replacement of the resistors R1 to R4 in the circuit in FIG. 13, and thereby the values of the impedance matching resistors can be made adjustable. Further, adjusting the values of the resistors will prevent the reflection of the write voltage. Also, in this case, the circuit as shown in FIG. 14(B) can be used as the variable resistors VR1 to VR4. That is, the circuit changes the setting values of a register REG 13 to thereby adjust the resistance of a circuit comprised of plural resistors R20, R21, R22 provided in parallel and switches SW41, SW42 connected in series to the resistors R21, R22.

Figure 15:
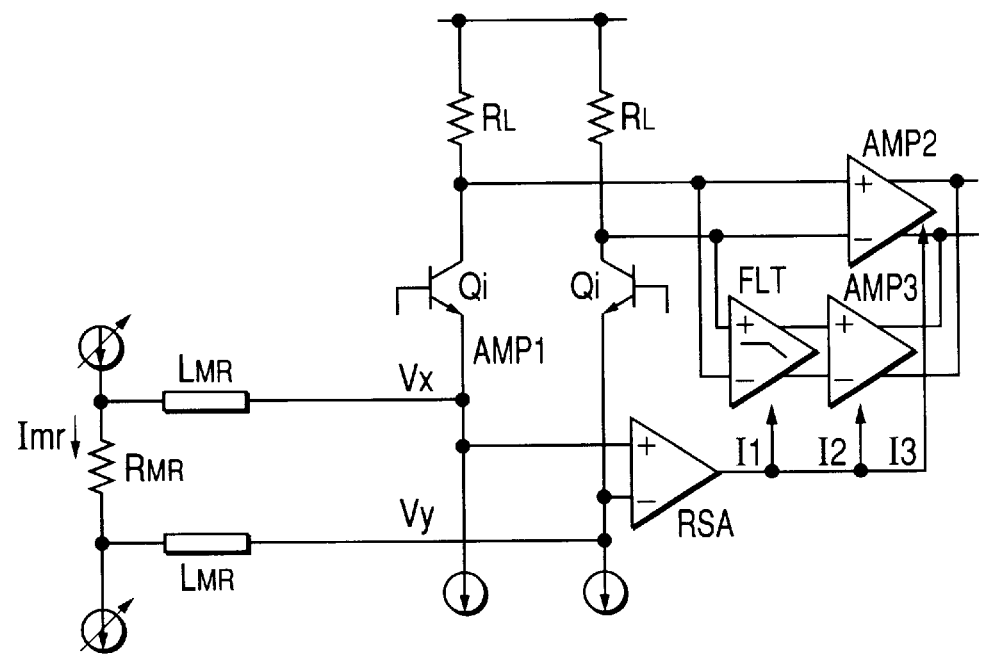
FIG. 15 is a circuit diagram illustrating an embodiment of a read amplifier provided in the control chip.

FIG. 15 illustrates an embodiment of a read amplifier provided in the control chip 300. As shown in the drawing, the read amplifier of this embodiment includes a first stage amplifier having the same configuration as a general read amplifier, which is indicated on the center by the symbol AMP1, in addition to this, a resistance sensing amplifier RSA that detects the resistance of the read head HDr, and a compensation circuit that compensates a gain and a bandwidth of the read amplifier in accordance with a detected resistance of the head.

The compensation circuit is configured with a filter circuit FLT having the same angular frequency ω as the angular frequency ω0 of the first stage amplifier AMP1, which passes the output signal of the first stage amplifier AMP1 with the same frequency characteristic as the frequency characteristic of the first stage amplifier AMP1; an amplifier AMP3 that outputs a current having the same frequency characteristic as that of the first stage amplifier AMP1 on the basis of the output voltage of the filter circuit FLT; an amplifier AMP2 that subtracts the current outputted from the amplifier AMP3 from the output current of the first stage amplifier AMP1 (in other words, adds the differential output of AMP3 in reverse phase to the input), whereby the gain attains a flat frequency response to the high frequency range.

The resistance-sensing amplifier RSA detects a resistance RMR of the read head HDr, and outputs currents I1, I2, I3 in accordance with the resistance RMR of the head. A specific read current Imr running through the read head HDr and a detection of a voltage across the read head HDr will determine the resistance RMR of the head. The currents I1, I2, I3 outputted from the resistance-sensing amplifier RSA are each supplied to the filter circuit FLT and the amplifiers AMP2, AMP3 for compensation, which compensates the variations of the gain and bandwidth of the first stage amplifier AMP1 due to the dispersions of the resistance RMR of the read head.

The gain G of the first stage amplifier AMP1 can be expressed as follows.

$$G = RL/(re + RMR + j\omega LMR) \text{tm} \quad (1)$$

Here, RL represents a load resistance of an input transistor Qi of the first stage amplifier AMP1, re an operating resistance of Qi, LMR a parasitic inductance of the transmission line (FPC) connecting the read head to the front chip.

Approximately, the DC gain of the first stage amplifier AMP1 is equivalent to RL/RMR, and the angular frequency ω0 becomes RMR/LMR. This confirms that the gain and bandwidth of the first stage amplifier AMP1 vary depending on the dispersions of the resistance RMR of the read head. In this embodiment, the resistance-sensing amplifier RSA detects the resistance RMR of the read head and outputs the currents I1, I2, I3 according to the resistance RMR, and thereby compensates the variations of the gain and bandwidth of the first stage amplifier AMP1 due to the dispersions of the resistance RMR of the read head.

Further, the foregoing expression (1) explains that the gain of the first stage amplifier AMP1 falls more in the higher frequency range due to the variations of the parasitic inductance LMR of the transmission line. In this embodiment, the compensation circuit comprised of the filter circuit FLT and the amplifiers AMP2, AMP3 compensates the gain fall of the first stage amplifier AMP1 in the higher frequency range due to the variations of the parasitic inductance LMR of the transmission line.

Although not illustrated in FIG. 15, the front chip 300 further contains a control register set by a command from the control chip 400, a control circuit that controls the inside of the front chip on the basis of the setting of the register, an interface circuit that receives and transmits signals to and from the control chip 400 by utilizing the transmission line for transmitting the read signal, and a current source that generates the read current Imr flowing through the read head, etc.

Figure 16:
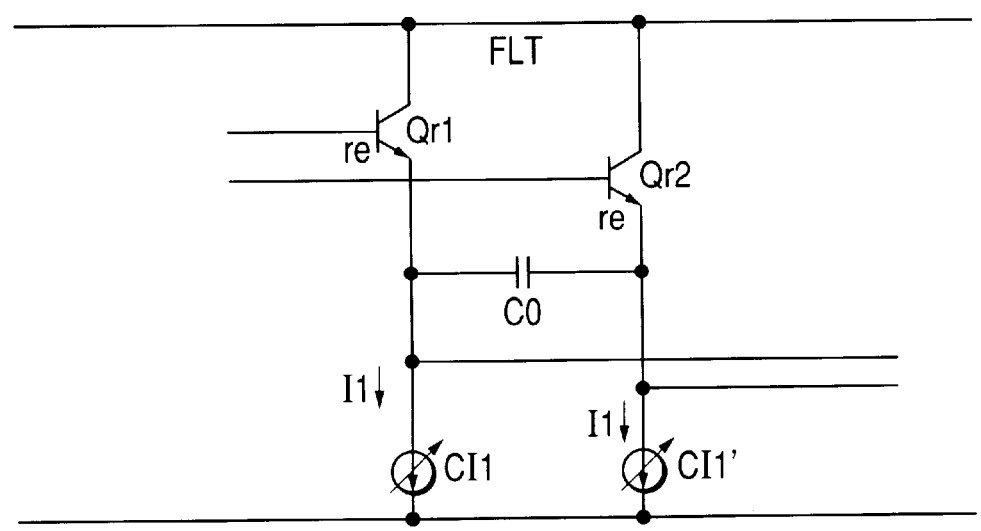
FIG. 16 is a circuit diagram illustrating a concrete example of a filter circuit constituting the read amplifier of the embodiment.
Figure 17:
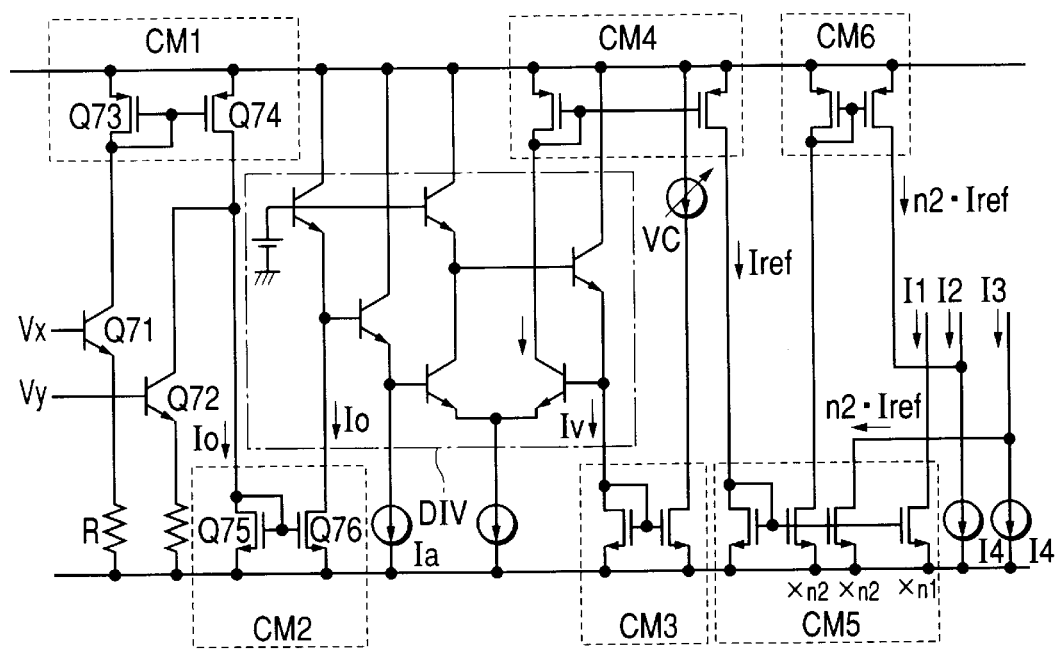
FIG. 17 is a circuit diagram illustrating a concrete example of a resistance-sensing amplifier constituting the read amplifier of the embodiment.
Figure 18:
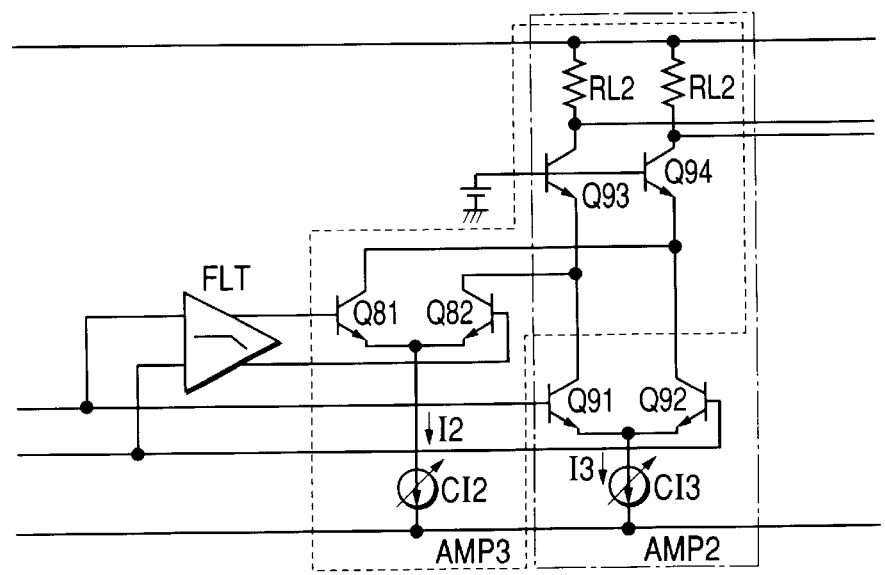
FIG. 18 is a circuit diagram illustrating a concrete example of a compensating amplifier constituting the read amplifier of the embodiment.

FIG. 16 to FIG. 18 illustrate concrete circuit examples for the filter circuit FLT, resistance-sensing amplifier RSA, and compensating amplifiers AMP2 and AMP3.

The filter circuit FLT is comprised of, as shown in FIG. 16, transistors Qr1, Qr2 that receive the output from the first stage amplifier AMP1 at the bases thereof, a capacitor C0 connected between the emitters of the transistors Qr1, Qr2, current sources CI1, CI1' that flow operating currents. The filter circuit FLT operates as a low-pass filter by the operating resistance re of the transistors Qr1, Qr2 and the capacitance C0.

The resistance-sensing amplifier RSA includes, as shown in FIG. 17, transistors Q71, Q72 that receive the voltages Vx, Vy of the terminals (T11, T12) connecting to the read head HDr at the bases thereof, a diode-connection MOSFET Q73 connected in series to Q71, a MOSFET Q74 configuring a current mirror circuit CM1 together with Q73, a diode-connection MOSFET Q75 connected in series to Q74, a MOSFET Q76 configuring a current mirror circuit CM2 together with Q75. The transistor Q72 having the base to which the head terminal voltage Vy is applied is connected in parallel with the MOSFET Q76 constituting the current mirror circuit CM2.

In the current mirror circuit CM1, a current Ix proportional to the voltage Vx at the head terminal flows, and in the current mirror circuit CM2, a current Io=(Ix–Iy) flows, the current Ix subtracted by a current Iy proportional to the voltage Vy at the head terminal. Since the specific read current Imr flows through the read head HDr, the voltage Vx–Vy across the read head terminals is given by (Vx–Vy)= RMR·Imr. Here, RMR is the resistance of the read head. The currents Ix, Iy are proportional to the voltages Vx, Vy, respectively, and (Ix–Iy) is proportional to (Vx–Vy) accordingly. Therefore, the current Io=(Ix–Iy) flowing through the current mirror circuit CM2 is equal to (RMR×Imr)/R, which is proportional to the product of the head resistance RMR and the read current Imr. That is, Io∝RMR·Imr.

The resistance-sensing amplifier RSA further includes a division circuit DIV that inputs the current Io flowing through the current mirror circuit CM2. This division circuit DIV divides the current Io flowing through the current mirror circuit CM2 by a current Iv flowing through a current mirror circuit CM3, and outputs a current Iref whose magnitude is equal to the result by the division multiplied by a current source Ia. Now, if the current Iv flowing through the current mirror circuit CM3 is set to a current equal to the read current Imr by adjusting a variable current source VC, the division circuit DIV will output a reference current Iref proportional to the resistance RMR of the read head (Iref= Ia·Io/Iv∝Ia·RMR·Io/Imr=Ia·RMR).

The resistance-sensing amplifier RSA transcribes the reference current Iref by current mirrors CM4 to CM6, and forms the specific currents I1, I2, I3 for the filter circuit FLT, and the compensating amplifiers AMP2, AMP3. Hereunder, the method of setting the values of the currents I1, I2, I3 will be described.

Since the filter circuit FLT is assumed to possess the same frequency characteristic as that of the first stage amplifier AMP1 whose angular frequency ω0 is equal to RMR/LMR, the angular frequency ω is needed to be made equal to ω0 (=RMR/LMR), when the filter circuit FLT is regarded as a filter comprised of a resistance re and a capacitance C0. That is, ω=1/(re·Co)=RMR/LMR is satisfied. On the other hand, the operating current I1 of the filter circuit FLT can be expressed by I1=(C0·Vt/LMR)·RMR.

Here, Vt is a constant called the thermal voltage, which is given by Vt=kT/q. That is, I1 is only needed to be a current proportional to the resistance RMR of the read head. Therefore, assuming that n1 is a constant, it is needed to set I1=n1·Iref. In the circuit as shown in FIG. 17, it is easy to output the current satisfying I1=n1·Iref, by setting appropriately the size of the MOSFETs that configure the current mirror circuits CM4, CM5.

In the circuit as shown in FIG. 17, provided that a current to be combined with the transcription current Iref of the current mirror circuits CM5, CM6 is I4, the constant is n2, the load resistance of the compensating amplifier is RL2, and I2 =I4−n2·Iref, I3=I4+n2·Iref are set, the gain Gc of the compensating amplifiers AMP2, AMP3 is given as follows. Gc=(I3−I2)·RL2/Vt=2·n2·Iref·RL2/Vt=2·n2·Ic·RMR RL2/Vt (although Iref∝Ia·RMR, taking Ic as a certain constant, Iref∝Ic·RMR is assumed). Since the gain G of the first stage amplifier AMP1 is RL/RMR, the total gain Gt (G·Gc) becomes equal to 2·n2·RL·RL2/Vt, which confirms to attain a constant gain independent of the resistance RMR of the read head.

The compensating amplifier AMP3 includes, as shown in FIG. 18, transistors Q81, Q82 that receive the output from the filter circuit FLT at the bases thereof, and a current source C12 connected to both the emitters of the transistors Q81, Q82. Also, the compensating amplifier AMP2 includes, as shown in FIG. 18, transistors Q91, Q92 that receive the output from the first stage amplifier AMP1 at the bases thereof, a current source C13 connected to both the emitters of the transistors Q91, Q92, and load resistors RL2, RL2' and transistors Q93, Q94 for constant currents that are connected in series, respectively. Further, the collector of the transistor Q81 constituting the amplifier AMP3 is connected in reverse phase to the collector of the transistor Q92 constituting the amplifier AMP2, and similarly the collector of Q82 is connected in reverse phase to the collector of Q91.

Further, assuming that the gain of the filter circuit FLT is constant (=1) regardless of the frequency, if an output variation of the first amplifier AMP1 increases the collector current of the transistor Q81 by ΔI, the collector currents of Q82 and Q91 will decrease by ΔI and the collector current of Q92 will increase by ΔI. Thereby, the currents flowing through the load resistors RL2, RL2' of the amplifier AMP2 become (I2/2+ΔI)+(I3/2−ΔI)=(I2+I3)/2. Here, since I2=I4−n2·Iref, I3=I4+n2·Iref are the initial setting, the currents flowing through the load resistors RL2, RL2' become I4, which is constant regardless of the resistance RMR of the read head. Therefore, the read amplifier of this embodiment is able to prevent the variations of the operating current and the gain due to the dispersions of the resistance RMR of the read head.

Figure 19:
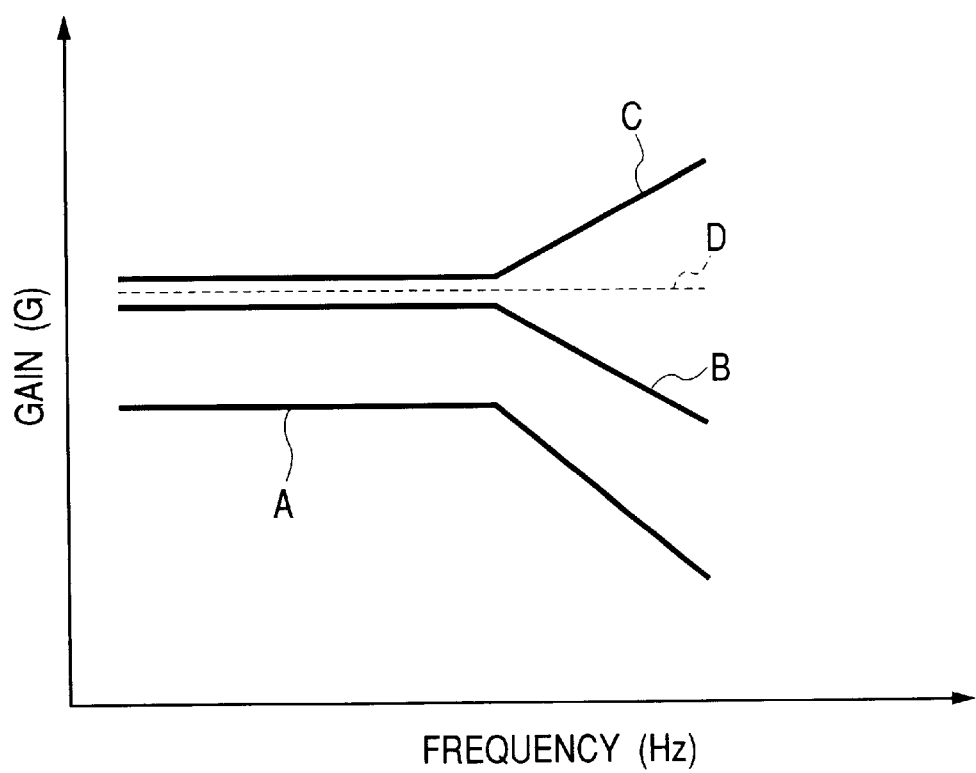
FIG. 19 is a chart illustrating a frequency characteristic of a first stage amplifier and a method of compensating the frequency characteristic by a compensation circuit in the read amplifier of the embodiment.

Further, in this embodiment, the frequency characteristic of the filter circuit FLT is assumed to be the same as that of the first stage amplifier AMP1, and the compensating amplifier AMP3 amplifies the output of this filter, and inputs the amplified to the amplifier AMP2 in reverse phase; thereby, the subtraction of the output currents is carried out. Accordingly, considering that the gain frequency characteristic of the first stage amplifier and the filter circuit FLT is the one as shown by the symbol A in FIG. 19, even if the original frequency characteristic of the amplifier AMP2 is the one as the symbol B, the output of the amplifier AMP2 will be compensated by the reverse frequency characteristic of the amplifier AMP3 (the symbol C), thus showing a flat frequency characteristic of the gain extending to a higher frequency range, as illustrated by the dotted line D.

Figure 20A:
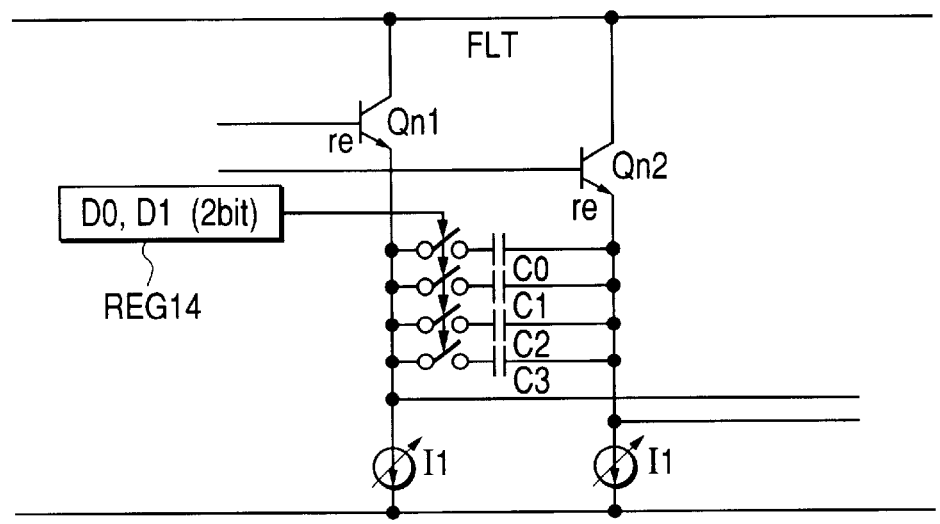
FIG. 20(A) and FIG. 20(B) are circuit diagrams illustrating modified configurations of the filter circuit and the compensation circuit constituting the read amplifier of the embodiment.
Figure 20B:
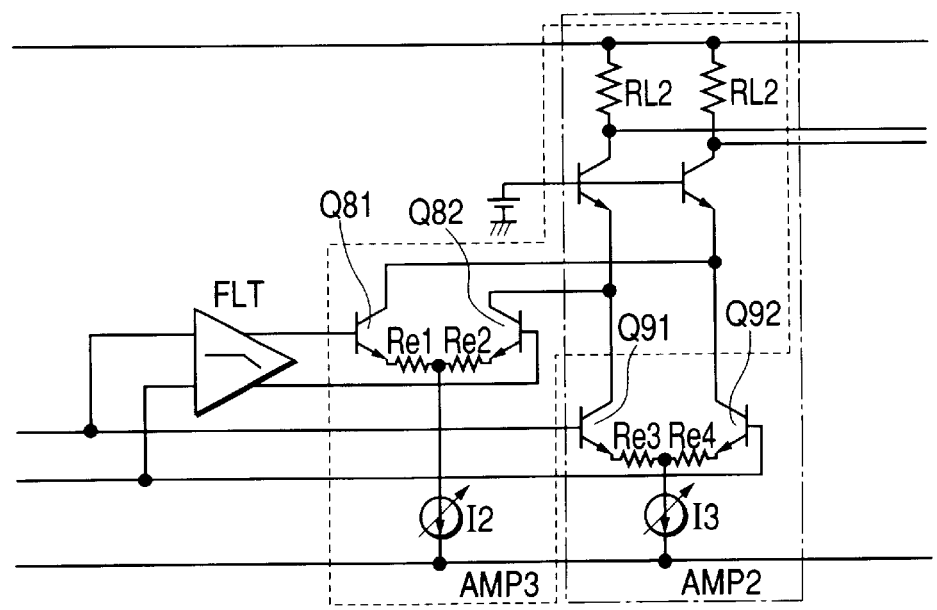

FIG. 20(A) illustrates a modified circuit example for the filter circuit FLT, and FIG. 20(B) illustrates a modified circuit example for the compensating amplifiers AMP2, AMP3. The filter circuit FLT in FIG. 20(A) is provided with plural capacitors C1 to C3 in parallel with the capacitor C0, and switches in series to the capacitors C0 to C3 each, whereby the discrepancy of the bandwidth due to the dispersion of the inductance LMR of the transmission line can be compensated by changing the setting of a register REG 14 to vary the combined capacitance.

In FIG. 20(B), the compensating amplifier AMP2 is provided with resistors Re1 to Re2 between the emitters of the input differential transistors Q81, Q82, and the amplifier AMP3 is provided with resistors Re3 to Re4 between the emitters of Q91, Q92; thereby, the compensating amplifiers expand the dynamic rages so as to handle a wide range of the input read signal from a small amplitude to a large.

FIG. 21 illustrates the timings of signals supplied to the control chip 400 from the system controller, in the storage media reading/writing system to which the front chip 300 and the control chip 400 of this invention are applied.

SLCK in FIG. 21(A) illustrates the clock transmitted from the system controller to the control chip, and SDATA in FIG. 21(B) illustrates the serial data supplied from the system controller to the control chip, which includes bit RWb to indicate the read or the write of the register, chip address CA0 to designate the chip, transfer code mode to designate a transfer and the like, covering all the channels, register address bit RA4 to RA0 to designate the register, data bit D7 to D0 to be set in the register. SEN in FIG. 21(c) is a serial enable signal showing that it is in serial data transfer mode.

The register address bit RA4 to RA0 of the serial data SDATA includes both the addresses of the register REG inside the control chip 400 and the addresses of the register REG inside the front chip 300; and the data bit D7 to D0 includes both the data to be set in the register REG inside the control chip 400 and the data to be set in the register REG inside the front chip 300.

Upon seeing the chip address CA0 and the transfer code mode inside the received serial data SDATA, the control circuit 410 inside the control chip 400 recognizes whether the setting is to the register REG inside the control chip 400 or it is to the register REG inside the front chip 300. Upon judging it as the setting to the register REG inside the front chip 300, the control circuit 410 transmits immediately to the front chip 300 the register address bit RA4 to RA0 and the data bit D7 to D0 contained in the serial data.

Figure 22:
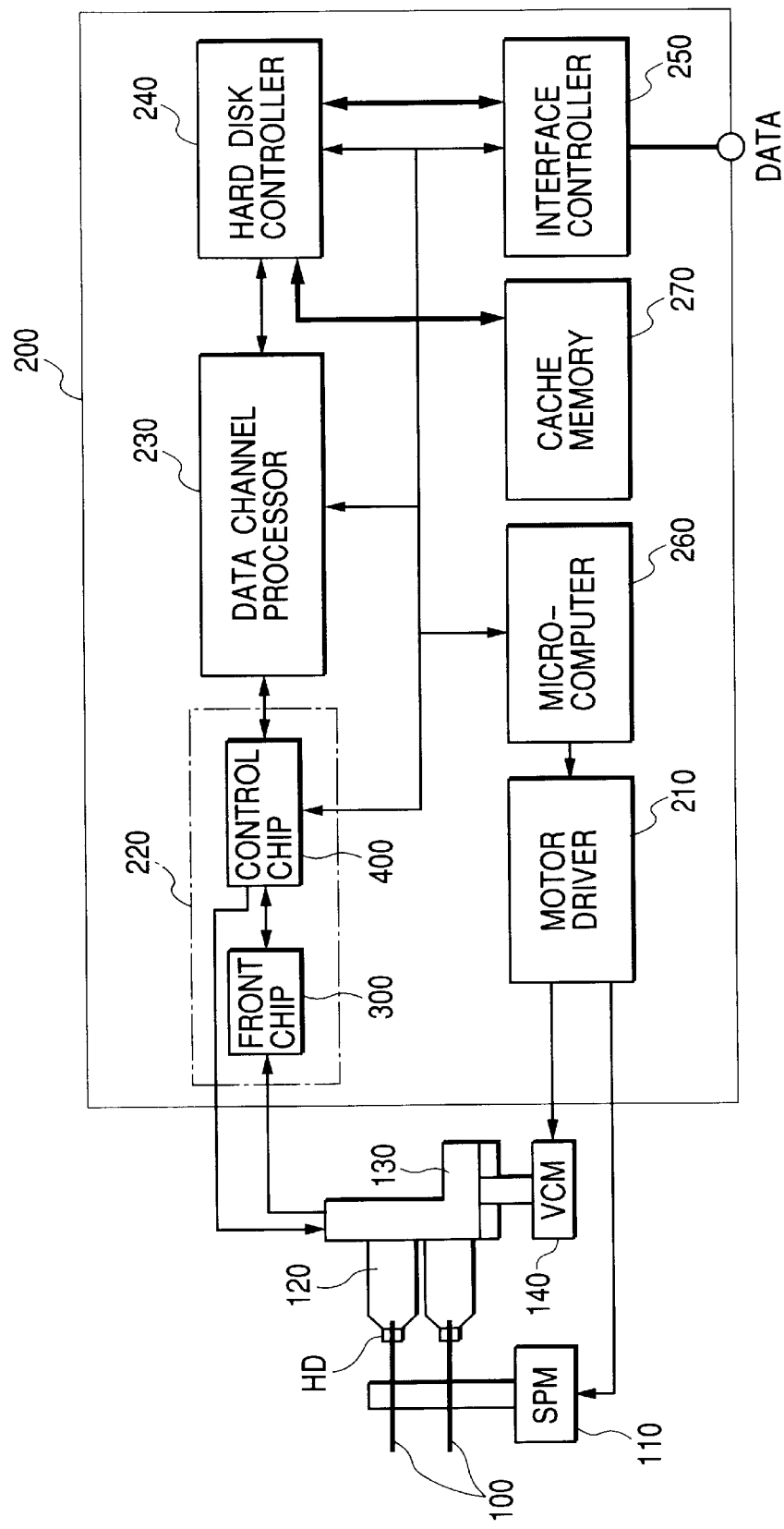
FIG. 22 is a block diagram of a hard disk drive as an example to which the storage media reading/writing system of the invention is effectively applied.

FIG. 22 is a block diagram of a hard disk drive as an example to which the storage media reading/writing system of the invention is effectively applied.

In FIG. 22, 100 signifies a recording medium such as a magnetic disk, 110 a spindle motor that rotates the magnetic disk 100, 120 an arm that contains a magnetic head HD (including a write head and a read head) at the front, 130 a carriage that holds the arm 120 so as to swing, and 140 an actuator such as a voice coil motor that shifts the carriage 130.

Further, 210 signifies a motor driver that drives the spindle motor 110 and the voice coil motor 130, which includes a spindle motor drive circuit and a voice coil motor drive circuit. 220 signifies a read/write circuit that amplifies a current according to a magnetic variation detected by the magnetic head HD to transmit the read signal to a data channel processor 230, and amplifies a write pulse signal from the data channel processor 230 to output a drive current of the magnetic head HD, which includes the front chip 300 and the control chip 400 as described in the embodiment.

Further, 240 denotes a hard disk controller that takes in read data transmitted from the data channel processor 230 to execute the error correction processing to the read data, and executes the error correction coding to write data from the host to output the data to the data channel processor 230. The data channel processor 230 performs a signal processing, such as a modulation/demodulation processing suitable for the digital magnetic recording and a waveform shaping in consideration of the magnetic recording characteristics, and so forth.

Further, 250 denotes an interface controller that exchanges and controls data between the present system and the external device, and the hard disk controller 240 is connected through the interface controller 250 to a host computer such as a microcomputer in the main frame of a personal computer. 260 denotes a system controller comprised of a microcomputer that administratively controls the whole system and calculates the sector positions and the like on the basis of address information supplied from the hard disk controller 240, 270 a cache memory for a buffer that temporarily stores the read data read out at a high speed from the magnetic disk. On the basis of a signal from the hard disk controller 240, the microcomputer 260 judges the operating mode that the signal indicates, and controls the parts inside the system in correspondence to the operating mode.

The motor driver 210 includes the spindle motor drive circuit and the voice coil motor drive circuit; and by a signal outputted from the microcomputer 260, the spindle motor drive circuit is servo-controlled so as to stabilize a relative speed of the head, and the voice coil motor drive circuit is servo-controlled so as to bring the center of the head into coincidence with the center of the track.

The motor driver 210, read/write circuit 220, data channel processor 230, hard disk controller 240, interface controller 250, microcomputer 260, cache memory 270 constitute a hard disk control system 200; and the control system 200, magnetic disk 100, spindle motor 110, arm 120 with the magnetic head HD, and voice coil motor 130 constitute the hard disk drive as one example of the storage media reading/writing system of this invention.

The embodiment of the invention being thus described, the invention is not limited to the aforementioned embodiments, and it is to be understood that various changes and modifications are possible without a departure from the spirit and scope of the invention. For example, the foregoing embodiment shows a case in which the control chip contains the write circuit and the front chip contains the read circuit, however these circuits can be applied to a case in which the front chip contains the read circuit as well as the write circuit (such as a system as proposed in the Japanese Published Unexamined Patent Application No. 2000-307850).

Further, in the embodiment, the resistance-sensing amplifier RSA constituting the read circuit contains the division circuit, however any circuit that outputs the current or voltage according to the resistance of the read head can be applied in replacement of the division circuit (for example, it may contain a subtraction circuit).

The embodiment has been described with the case in which the invention is applied to a hard disk drive as the applicable field, which is the background of the invention; however, the invention is not limited to that, and it can also be applied to a storage unit, such as a floppy disk drive and a magneto-optical (MO) disk drive, etc.

The invention disclosed in this application achieves various effects, and the typical ones are as follows.

That is, the storage media reading/writing system to which the invention is applied prevents the thermal deformation of the head suspending part due to the write current to achieve a highly accurate reading and writing. Further, the system shortens the signal lines that connect the head and the semiconductor integrated circuit containing the read signal amplifier, which makes the signal lines immune from noises, and achieves a data reading at a high speed without deteriorating the SN ratio.

Further, the storage media reading/writing system separately forms the semiconductor integrated circuit containing the amplifier of the read signal from the head and the semiconductor integrated circuit containing the amplifier to write and drive the head, and installs only the semiconductor integrated circuit containing the amplifier of the read signal on the side of the arm as a head retaining means; accordingly, the system succeeds in restricting the weight increase of the semiconductor integrated circuit mounted on the arm to thereby achieve a high-speed reading and writing without a hindrance to the seek operation.

What is claimed is:

1. A storage media reading/writing system, comprising:
    media drive means that drives recording media;
    a media drive circuit that electrically controls and drives the media drive means;
    head retaining means having a head that reads data recorded on the media and outputs as an electrical signal, or writes data in the media;
    moving means that moves the head retaining means,
    a head drive circuit that amplifies a read signal from the head, or drives the head for writing;
    a signal processing circuit that demodulates the read signal amplified by the head drive circuit or modulates write data into a signal suitable for a magnetic recording; and
    a controller that controls the media drive circuit, the head drive circuit, and the signal processing circuit,
    wherein the head drive circuit includes a first semiconductor integrated circuit having an amplifier that amplifies the read signal from the head, and
    a second semiconductor integrated circuit having a circuit that receives data from the signal processing circuit and generates a drive signal to drive the head,
    wherein the head retaining means has the head mounted on one end thereof, and the second semiconductor integrated circuit installed on a part near the moving means
    wherein a flat surface formed by the head retaining means comprises:
        a first hole, and
        a second hole being closer to the head than the first hole, and
        wherein the first semiconductor integrated circuit is mounted on the flat surface in a state of a flip chip between the first hole and the second hole.

2. A storage media reading/writing system according to claim 1, wherein the head retaining means has an immovable part arranged near the moving means and a movable part arranged to face the recording media, and the first semiconductor integrated circuit is installed on the movable part of the head retaining means.

3. A storage media reading/writing system according to claim 2, wherein the immovable part is constituted of a member of a high rigidity, and the movable part is constituted of a member more elastic than that of the immovable part.

4. A storage media reading/writing system according to claim 1, wherein the first semiconductor integrated circuit and the second integrated circuit are connected with a bendable wiring cable, and the first semiconductor integrated circuit is coupled with the wiring cable through bumps of a fusible metal on a specific position thereof.

5. A storage media reading/writing system according to claim 4, wherein the drive signal supplied to the head from the second integrated circuit is a voltage signal.

6. A storage media reading/writing system according to claim 5, wherein the second semiconductor integrated circuit to generate the drive signal supplied to the head includes a resistor for an impedance matching that attains matching with a characteristic impedance of a wiring connecting the head to the second semiconductor integrated circuit.

7. A storage media reading/writing system according to claim 6, wherein the resistor for an impedance matching is a variable resistor in which the resistance value can be adjusted.

8. A storage media reading/writing system according to claim 4, wherein, on the first semiconductor integrated circuit, the bumps for terminals connected to the second semiconductor integrated circuit are arranged along one side of a chip on which the first semiconductor integrated circuit is formed, and the bumps for terminals connected to the head are arranged along the other side of the chip, and two rows of the bumps are mounted on the wiring cable along the width direction thereof.

9. A storage media reading/writing system according to claim 1, wherein the first semiconductor integrated circuit includes a compensation circuit that compensates a deterioration of a frequency characteristic of a gain and a bandwidth due to dispersions of the resistance of the head.

10. A storage media reading/writing system according to claim 1, wherein the first semiconductor integrated circuit and the second semiconductor integrated circuit are connected to each other with two power supply lines and two transmission lines.

11. A storage media reading/writing system according to claim 1, wherein the head includes a read head and a write head.

12. A storage media reading/writing system according to claim 11, wherein a plurality of the heads are provided, a plurality of the first semiconductor integrated circuits are provided corresponding to the number of the heads, and the second semiconductor integrated circuit is provided as a common circuit with respect to a plurality of the first semiconductor integrated circuits.

13. A storage media reading/writing system according to claim 4, wherein the bendable wiring cable includes the first hole and the second hole.

* * * * *